United States Patent
Afzal

(10) Patent No.: US 9,933,507 B2
(45) Date of Patent: Apr. 3, 2018

(54) APPARATUS, SYSTEM AND METHOD OF DETERMINING A LOCATION OF A RADIO BEACON

(71) Applicant: Fathom Systems Inc., Vancouver (CA)

(72) Inventor: Muhammad Haris Afzal, Vancouver (CA)

(73) Assignee: Fathom Systems Inc., Vancouver (CA)

( * ) Notice: Subject to any disclaimer, the term of this patent is extended or adjusted under 35 U.S.C. 154(b) by 0 days.

(21) Appl. No.: 15/525,282

(22) PCT Filed: Nov. 10, 2016

(86) PCT No.: PCT/CA2016/051312
§ 371 (c)(1),
(2) Date: May 8, 2017

(87) PCT Pub. No.: WO2017/079842
PCT Pub. Date: May 18, 2017

(65) Prior Publication Data
US 2018/0038937 A1 Feb. 8, 2018

Related U.S. Application Data

(60) Provisional application No. 62/254,467, filed on Nov. 12, 2015.

(51) Int. Cl.
*G01S 3/02* (2006.01)
*G01S 5/02* (2010.01)
(Continued)

(52) U.S. Cl.
CPC ............... *G01S 5/0252* (2013.01); *G01S 3/28* (2013.01); *G01S 19/13* (2013.01)

(58) Field of Classification Search
CPC .................................. G01S 3/02; G01S 5/0252
(Continued)

(56) References Cited

U.S. PATENT DOCUMENTS 6,933,889 B1 * 8/2005 Wolf .................. G01S 5/02
342/443
7,751,829 B2 7/2010 Masuoka et al.
(Continued)

FOREIGN PATENT DOCUMENTS

WO 2015114313 A1 8/2015

OTHER PUBLICATIONS

International Patent Application No. PCT/CA2016/051312, International Search Report and Written Opinion dated Jan. 26, 2017.

*Primary Examiner* — Harry K Liu
(74) *Attorney, Agent, or Firm* — Borden Ladner Gervais LLP; Geoffrey deKleine

(57) ABSTRACT

A method of determining locations of radio beacons includes: self-locating and automatically orienting electronic device hubs, determining angles of arrival of radio beacon signals at the electronic device hubs using received signal strength of radio beacons, refining received signal strength based on angle of arrival of the radio beacon signals, determining range using the refined received signal strength and antenna orientation based propagation loss models that compensate for obstacles in a deployment environment and, combining angles of arrival and ranges determined at the electronic device hubs at one of the electronic device hubs and determining locations of radio beacons within a predetermined acceptable accuracy, wherein the electronic hub devices function as receiving devices and radio beacons and radio beacon signals from a subset of the radio beacons are received at more than one electronic hub device.

16 Claims, 24 Drawing Sheets

(51) Int. Cl.
  *G01S 19/13*  (2010.01)
  *G01S 3/28*  (2006.01)
(58) Field of Classification Search
  USPC .......................................... 342/451
  See application file for complete search history.

(56) References Cited

U.S. PATENT DOCUMENTS

| | | |
|---|---|---|
| 8,712,690 B1 | 4/2014 | White et al. |
| 9,125,165 B2 | 9/2015 | Gonikberg |
| 2013/0094440 A1* | 4/2013 | Moshfeghi ............ H04W 88/06 370/328 |
| 2014/0236474 A1* | 8/2014 | Hansen ................ G01S 5/0252 701/408 |
| 2015/0172872 A1* | 6/2015 | Alsehly ................ G01S 5/0236 455/457 |
| 2016/0007315 A1* | 1/2016 | Lundgreen ................ G01S 3/46 455/67.11 |
| 2016/0255604 A1* | 9/2016 | Venkatraman ........ H04W 24/08 455/456.1 |

* cited by examiner

APPARATUS, SYSTEM AND METHOD OF DETERMINING A LOCATION OF A RADIO BEACON

TECHNICAL FIELD

The present disclosure relates to methods and apparatus for locating radio beacons using received signal strength of radio signals received from the radio beacons.

BACKGROUND

In some environments, such as indoor or in areas where many natural or manufactured obstacles are present, for example, GNSS signal reception may be weak. In these environments, beacon positioning systems that rely entirely on GNSS signals are generally inoperable. Thus, other types of beacon location systems that rely on received signal strength or signal timing, for example, may be used.

Received signal strength is often used to estimate range of a radio beacon from multiple receivers, which may in turn be used to estimate the radio beacon's location. When obstacles are present between the radio beacon and the receivers, the radio beacon signals may be blocked or reflections may result such that a determined location is less reliable and less accurate. In addition, for receivers with directional antennas, correct determination of the radio beacon's location is dependent on an orientation of the receivers relative to one another. Orientation is typically performed manually because automated methods are often not reliable. For example, determining orientation using magnetic field sensors of the beacons is particularly unreliable in environments in which metal objects are present.

In some environments, signal timing may produce more accurate range results than received signal strength, however, signal timing is not usable with third party hardware because timing synchronization between the beacon and the receiver is not achievable. As a result, applications of signal timing based location determination may be limited.

SUMMARY

In an aspect of the present disclosure there is provided, a method of determining locations of radio beacons of a location system comprising: determining locations of electronic hub devices of the location system, storing the locations in memories of the electronic hub devices; determining relative orientations of antennas of the electronic hub devices, storing the relative orientations in memories of the electronic hub devices; receiving, at the antennas of the electronic hub devices, radio beacon signals from the radio beacons, the antennas configured to receive the radio beacon signals at multiple orientations relative to the electronic hub devices, radio sub-systems of the electronic hub devices in communication with the antennas generating digitized data representing received signal strengths of received radio beacon signals at the multiple orientations for the electronic hub devices, the radio beacon signals from a subset of the radio beacons received by more than one electronic hub device; determining, at main processor systems in communication with the radio sub-systems of the electronic hub devices, estimated received signal strengths for the multiple orientations of the electronic hub devices based on the received signal strengths of the received radio beacon signals over a period of time; determining, at the main processor systems, angles of arrival of the received radio beacon signals by identifying orientations of the antennas of the electronic hub devices corresponding to strongest ones of the received radio beacon signals, the strongest ones determined by comparing the estimated received signals strengths of the multiple orientations of the radio beacons, the subset of the radio beacons being associated with angles of arrival at the more than one electronic hub device; determining, at the main processor systems, ranges between the electronic hub devices and the radio beacons by calculating refined received signal strengths of the radio beacons based on the estimated received signal strengths and gain patterns of the antennas of the electronic hub devices and applying propagation loss models associated with the antenna orientations to the refined received signal strengths, the subset of the radio beacons being associated with ranges from the more than one electronic hub device; and combining the angles of arrival, the ranges and associated uncertainties in an estimator based on the relative orientations to determine the locations of the radio beacons of the subset of radio beacons in a deployment environment.

According to an example, the estimated received signal strength is determined by identifying a frequency with least traffic and selecting a received signal strength associated with that frequency, the received signal strength being weighted based on a volume of traffic.

According to an example, the radio beacon signals are BLE signals and the frequency is one of three frequencies, the three frequencies corresponding to three transmission channels.

According to another example, the radio beacon signals are WiFi signals and the frequency is one of twenty-four frequencies, the twenty-four frequencies corresponding to twenty-four transmission channels.

In another aspect there is provided a method of determining locations of radio beacons of a location system in a deployment environment, comprising: determining locations of electronic hub devices of the location system, storing the locations in memories of the electronic hub devices; assigning one of the electronic hub devices as a master hub device, orientations of others of the electronic hub devices relative to the master hub device stored in memory of the master hub device; receiving, at antennas of the electronic hub devices, radio beacon signals from the radio beacons, the antennas configured to receive the radio beacon signals at multiple orientations relative to the electronic hub devices, radio sub-systems of the electronic hub devices in communication with the antennas generating digitized data representing received signal strengths of received radio beacon signals at the multiple orientations for the electronic hub devices, the radio beacon signals from a subset of the radio beacons received by more than one electronic hub device; determining, at main processor systems in communication with the radio sub-systems of the electronic hub devices, estimated received signal strengths for the multiple orientations of the electronic hub devices based on the received signal strengths of the received radio beacon signals over a period of time; determining, at the main processor systems, angles of arrival of the received radio beacon signals by identifying orientations of the antennas of the electronic hub devices corresponding to strongest ones of the received radio beacon signals, the strongest ones determined by comparing the estimated received signals strengths of the multiple orientations of the radio beacons, the subset of the radio beacons being associated with angles of arrival at the more than one electronic hub device; determining, at the main processor systems, ranges between the electronic hub devices and the radio beacons by calculating refined received signal strengths of the radio beacons based on the estimated received signal strengths and gain patterns of the antennas of the electronic hub devices and applying propagation loss models associated with the antenna orientations to the refined received signal strengths, the subset of the radio beacons being associated with ranges from the more than one electronic hub device; receiving, at the master hub device, the angles of arrival and the ranges determined at others of the electronic hub devices; combining the angles of arrival and the ranges of the others of the electronic hub devices with the angles of arrival and the ranges determined at the master hub device in an estimator to determine locations of the radio beacons in the deployment environment; wherein others of the electronic hub devices function as receiving devices and radio beacons.

In another aspect of the present disclosure there is provided an electronic hub device for determining locations of radio beacons, comprising: a GNSS antenna; a GNSS subsystem; an antenna comprising six directional antennas to receive radio beacon signals at six orientations; a radio sub-system in communication with the antenna to generate digitized data representing received signal strengths of received radio beacon signals at the six orientations; a main processor system in communication with the radio sub-system to: determine a location of the electronic hub device, determine estimated received signal strengths for the six orientations of the electronic hub devices based on the received signal strengths of the received radio beacon signals over a period of time, determine angles of arrival of the received radio beacon signals by identifying orientations of the antenna corresponding to strongest ones of the received radio beacon signals, the strongest ones determined by comparing the estimated received signals strengths, determine ranges by calculating refined received signal strengths based on the estimated received signal strengths and gain patterns of the antenna and applying propagation loss models associated with the antenna orientations to the refined received signal strengths and map the angles of arrival and ranges to locations using the location of the electronic hub device.

According to an example, the location is determined based on self-location by the electronic hub device using the GNSS antenna and GNSS sub-system.

According to yet another example, the propagation loss model compensates for obstacles in front of one or more of the six antenna directions in the deployment environment.

In another aspect of the present disclosure there is provided a beacon location system comprising: a plurality of radio beacons to generate radio beacon signals; a plurality of electronic hub devices having known locations and orientations, the plurality of electronic hub devices comprising: antennas to receive radio beacon signals at multiple orientations; radio sub-systems in communication with the antennas to generate digitized data representing received signal strengths of received radio beacon signals at the multiple orientations; main processor systems in communication with the radio sub-systems to: determine estimated received signal strengths for the multiple orientations of the electronic hub devices based on the received signal strengths of the received radio beacon signals over a period of time, determine angles of arrival of the received radio beacon signals by identifying orientations of the antennas corresponding to strongest ones of the received radio beacon signals, the strongest ones determined by comparing the estimated received signals strengths, determine ranges by calculating refined received signal strengths based on the estimated received signal strengths and gain patterns of the antennas and applying propagation loss models associated with the antenna orientations to the refined received signal strengths; wherein one of the plurality of electronic hub devices is a master hub device, the master hub device combines the angles of arrival and ranges determined by others of the plurality of electronic hub devices with angles of arrival, ranges and associated uncertainties determined by the master hub device in an estimator based on relative orientations of the others of the plurality of electronic hub devices to the master hub device+to determine locations of the plurality of radio beacons, the master hub device and the others of the plurality of electronic hub devices functioning as receiving devices and radio beacons.

In yet another aspect of the present disclosure there is provided a method of determining an orientation of an electronic hub device relative to a master hub device, comprising: operating the electronic hub device in a receiving mode to receive radio beacon signals from the master hub device at an antenna at multiple orientations and generate, at a radio sub-system in communication with the antenna, digitized data representing received signal strengths of received radio beacon signals at the multiple orientations; determining, at a main processor systems in communication with the radio sub-system of the electronic hub device, estimated received signal strengths for the multiple orientations of the electronic hub device based on the received signal strengths of the received radio beacon signals over a period of time; operating the master hub device in a receiving mode to receive radio beacon signals from the electronic hub device at an antenna at multiple orientations and generate, at a radio sub-system in communication with the antenna, digitized data representing received signal strengths of received radio beacon signals at the multiple orientations; determining, at a main processor systems in communication with the radio sub-system of the master hub device, estimated received signal strengths for the multiple orientations of the master hub device based on the received signal strengths of the received radio beacon signals over a period of time; determining, at the main processor systems, angles of arrival of the received radio beacon signals by identifying orientations of the antennas of the electronic hub device and master hub device corresponding to strongest ones of the received radio beacon signals, the strongest ones determined by comparing the estimated received signals strengths; generating and storing, in memory of the master hub device, a data structure of orientation of the electronic hub device relative to the master hub device.

In another aspect of the present disclosure there is provided a method of determining locations of radio beacons in a deployment environment, comprising: receiving, at antennas of electronic hub devices, radio beacon signals from the radio beacons, the antennas configured to receive the radio beacon signals at multiple orientations relative to the electronic hub devices, radio sub-systems of the electronic hub devices in communication with the antennas generating digitized data representing received signal strengths of received radio beacon signals, the radio beacon signals from a group of the radio beacons received at more than one of the multiple orientations for one or more of the electronic hub devices; determining, at main processor systems in communication with the radio sub-systems of the electronic hub devices, estimated received signal strengths for ones of the multiple orientations of the electronic hub devices at which the radio beacon signals are received based on the received signal strengths of the received radio beacon signals over a period of time; determining, at the main processor systems of ones of the electronic hub devices, single observations and uncertainties comprising range and direction estimations of ones of the radio beacons relative to the ones of the electronic hub devices, locations and orientations of the electronic hub devices being known, the single observations and the uncertainties determined by combining estimated received signal strengths and corresponding weights for the ones of the multiple orientations of the ones of the electronic hub devices, the corresponding weights based on relative values of the estimated received signal strengths for the ones of the multiple orientations; determining locations of the radio beacons by combining, in an estimator, for ones of the radio beacons belonging to the group of the radio beacons, the single observations and the uncertainties; wherein the locations of the radio beacons are based on the estimated received signal strengths of all of the ones of the multiple orientations of the electronic hub devices.

According to an example, the uncertainties are equal to a largest one of the corresponding weights.

According to another example, for radio beacons not belonging to the group of radio beacons, the single observation is the location.

In still another aspect of the present disclosure there is provided a method of determining locations of radio beacons of a location system in a deployment environment, comprising: determining locations of electronic hub devices of the location system, storing the locations in memories of the electronic hub devices; assigning one of the electronic hub devices as a master hub device, orientations of others of the electronic hub devices relative to the master hub device stored in memory of the master hub device; receiving, at antennas of the electronic hub devices, radio beacon signals from the radio beacons, the antennas configured to receive the radio beacon signals at multiple orientations relative to the electronic hub devices, radio sub-systems of the electronic hub devices in communication with the antennas generating digitized data representing received signal strengths of received radio beacon signals at the multiple orientations for the electronic hub devices, the radio beacon signals from a subset of the radio beacons received by more than one electronic hub device; determining, at main processor systems in communication with the radio sub-systems of the electronic hub devices, estimated received signal strengths for the multiple orientations of the electronic hub devices based on the received signal strengths of the received radio beacon signals over a period of time; determining, at the main processor systems, angles of arrival of the received radio beacon signals by identifying orientations of the antennas of the electronic hub devices corresponding to strongest ones of the received radio beacon signals, the strongest ones determined by comparing the estimated received signals strengths of the radio beacons, the subset of the radio beacons being associated with angles of arrival at the more than one electronic hub device; determining, at the main processor systems, ranges between the electronic hub devices and the radio beacons are calculated based on times of arrival of the radio beacon signals at the electronic hub devices and corresponding times of departure of the radio beacon signals from the radio beacons, the subset of the radio beacons being associated with ranges from the more than one electronic hub device; receiving, at the master hub device, the angles of arrival and the ranges determined at others of the electronic hub devices; combining the angles of arrival and the ranges of the others of the electronic hub devices with the angles of arrival and the ranges determined at the master hub device in an estimator to determine locations of the radio beacons in the deployment environment; wherein others of the electronic hub devices function as receiving devices and radio beacons.

In another aspect of the present disclosure there is provided a method of determining locations of radio beacons of a location system in a deployment environment, comprising: receiving, at antennas of the electronic hub devices, radio beacon signals from the radio beacons, the antennas configured to receive the radio beacon signals at multiple orientations relative to the electronic hub devices, radio sub-systems of the electronic hub devices in communication with the antennas generating digitized data representing received signal strengths of received radio beacon signals at the multiple orientations for the electronic hub devices, locations of the electronic hub devices being known; determining, at main processor systems in communication with the radio sub-systems of the electronic hub devices, estimated received signal strengths for the multiple orientations of the electronic hub devices based on the received signal strengths of the received radio beacon signals over a period of time; determining, at the main processor systems, angles of arrival of the received radio beacon signals by identifying orientations of the antennas of the electronic hub devices corresponding to strongest ones of the received radio beacon signals, the strongest ones determined by comparing the estimated received signals strengths of the multiple orientations of the radio beacons; determining, at the main processor systems, time of flight ranges between the electronic hub devices and the radio beacons based on timing information of the radio beacon signals between synchronized electronic hub device and radio beacon pairs; combining the angles of arrival and the time of flight ranges in an estimator to determine locations of the radio beacons in the deployment environment.

According to an example, the antennas comprise multiple directional antennas to receive the radio beacon signals at multiple orientations relative to the electronic hub devices.

According to another example, the antennas comprise mechanically steered directional antennas to receive the radio beacon signals at multiple orientations relative to the electronic hub devices.

According to another example, the electronic hub devices comprise GNSS receivers and the known location is determined based on self-location by the electronic hub devices.

DRAWINGS

The following figures set forth embodiments of the present disclosure in which like reference numerals denote like parts. Embodiments of the present disclosure are illustrated by way of example and not by way of limitation in the accompanying figures.

DETAILED DESCRIPTION

Figure 1:
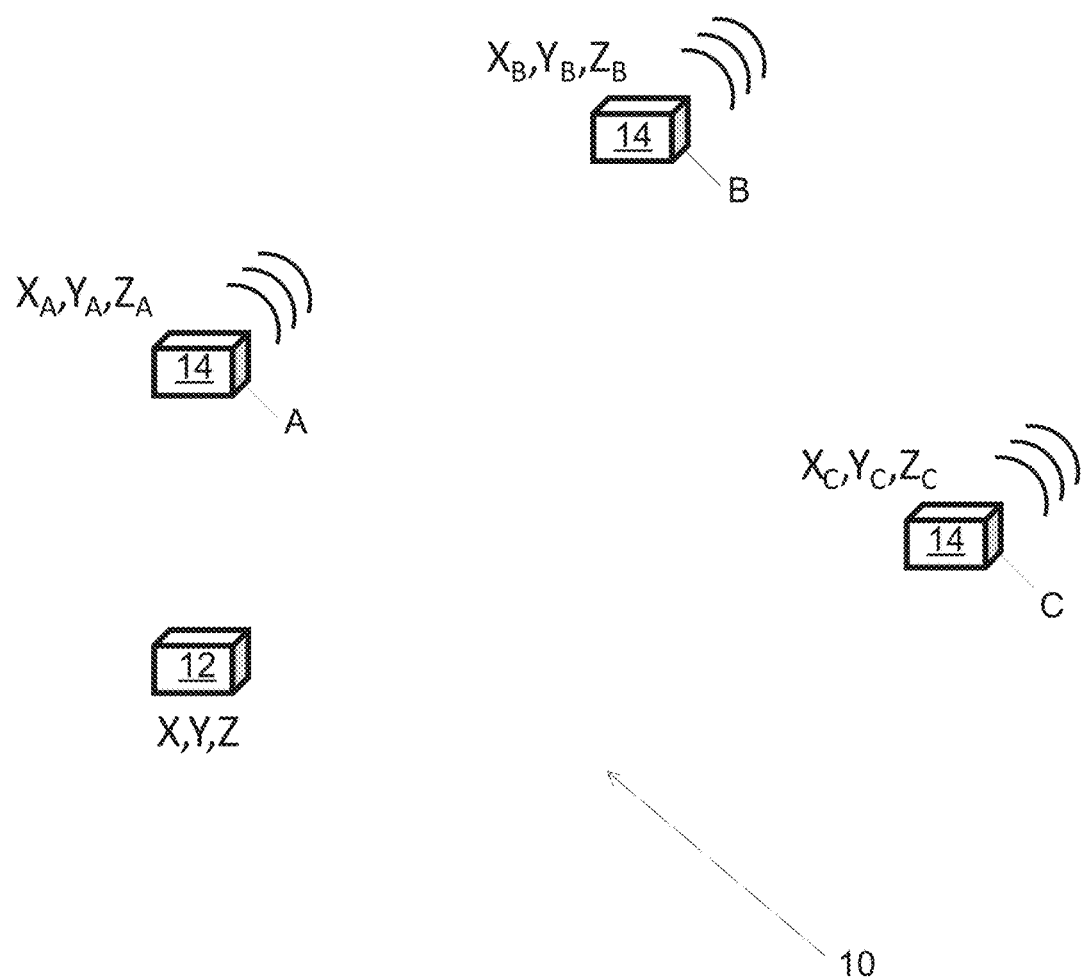
FIG. 1 is a schematic diagram of an electronic hub device and radio beacons of a radio beacon location system according to an example.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. Unless explicitly stated, the methods described herein are not constrained to a particular order or sequence. Additionally, some of the described methods or elements thereof can occur or be performed at the same point in time. In other instances, well-known methods, procedures and components have not been described in detail so as not to obscure the examples described herein. Also, the description is not to be considered as limiting the scope of the examples described herein.

Referring to FIG. 1, an example beacon location system 10 including an electronic hub device 12 and three radio beacons 14 is shown. When performing a method of locating radio beacons as described herein, the electronic hub device 12 determines locations of the radio beacons 14. The radio beacon location system 10 is operable in any deployment environment including outdoors, indoors and in environments in which GNSS signal reception is weak, such as in dense urban environments, for example. The radio beacon system 10 has particular advantages when the radio beacons 14 of the system 10 do not have GNSS location capability.

Some examples of deployment environments of the radio beacon location system 10 include: office structures, retail structures, hospitals, hotels, points of interest, such as tourist attractions, for example, industrial and manufacturing structures, educational campuses, sporting venues, transit facilities, cargo handling ports and resource extraction locations, for example.

The radio beacon location system 10 of FIG. 1 is shown as an example. The radio beacon location system 10 may include any number of electronic hub devices 12 and radio beacons 14. Some deployments may include a single electronic hub device 12 and a single radio beacon 14, a few electronic hub devices 12 and tens of radio beacons 14, tens of electronic hub devices 12 and hundreds of radio beacons 14 or even larger deployments. The number of radio beacons 14 per electronic hub device 12 is not fixed and may be determined based on the deployment environment. The radio beacon location system 10 is applicable with any type of radio signal, such as BLE (Bluetooth™ Low Energy), Bluetooth™, FM, AM, WiFi, Digital TV, ZigBee or 6LoW-Pan, for example.

Figure 2:
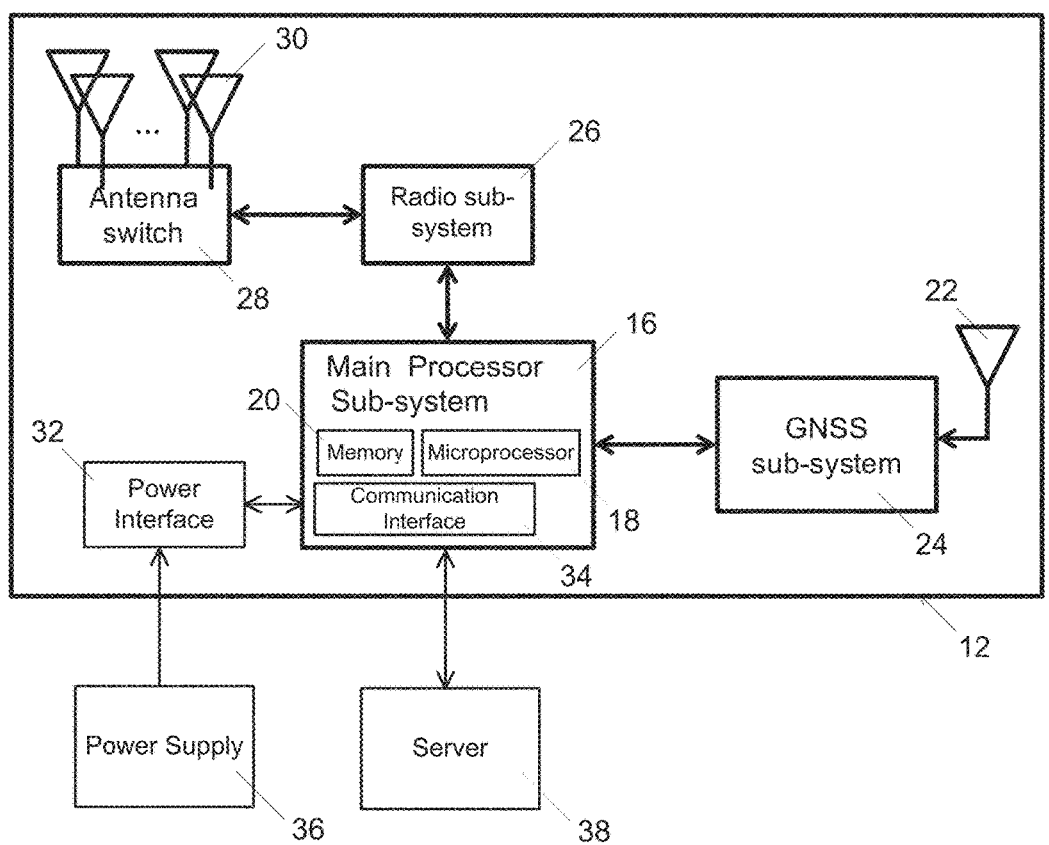
FIG. 2 is a schematic diagram of an electronic hub device according to an example.

Referring also to FIG. 2, the electronic hub device 12 includes a main processor sub-system 16. The main processor sub-system 16 controls overall operation of the electronic hub device 12. The main processor sub-system 16 includes a microprocessor 18, a memory 20 and a communication interface 34. The communication interface 34 enables communication with a server 38 via a wireless or a wired connection. The server 38 may be a single server or a group of servers in communication with one another. An example of a main processor sub-system 16 is a Single Board Computer (SBC) with an Operating System (OS).

The electronic hub device 12 further includes a GNSS antenna 22 to receive GNSS signals and a GNSS sub-system 24 in communication with the main processor sub-system 16 and the GNSS antenna 22. The GNSS sub-system 24 generates digitized GNSS data corresponding to the GNSS signals for further processing by the main processor sub-system 16. Examples of a GNSS sub-system 24 include: a standalone GNSS receiver capable of generating a location estimate locally, an Assisted GNSS (A-GNSS) receiver that receives assistance data from another device to provide a location estimate, a Radio Frequency (RF) Front End (FE) in association with a Software Defined Radio (SDR) receiver at the electronic hub device 12 or distributed over one or more servers.

The electronic hub device 12 is capable of determining its location using the digitized GNSS data. In environments in which the signals from the GNSS satellites are weak, the electronic hub device 12 may communicate with the server 38 to process the digitized GNSS data over time. Depending on the strength of GNSS signals received, self-location may be immediate or may take hours or days, for example. As such, the electronic hub device 12 may self-locate by determining its location locally or by communicating with the server to determine its location. The electronic hub device 12 may alternatively determine its location using another method, such as using other networking structures located nearby such as Cell-ID and WiFi, for example. Alternatively, the electronic hub device 12 may retrieve information from the memory 20 that was stored at the time the electronic hub device 12 was deployed. In general, the location of the electronic hub device 12 is known and is used to determine locations of the radio beacons 14 in the methods described herein.

Radio sub-system 26 receives radio beacon signals from the radio beacons 14 via an antenna 30 and generates digitized data representing received signal strengths of the radio beacon signals received at the electronic hub device 12 at multiple orientations. The radio sub-system 26 communicates with the main processor sub-system 16 of the electronic hub device 12 and an antenna switch 28. The antenna switch 28 controls the antenna 30 of the electronic hub device 12. Radio sub-system 26 also functions as a transmitter to transmit beacon signals so that other electronic hub devices 12 may locate the electronic hub device 12. The electronic hub device 12 is also capable of transmitting the digitized data for receipt at another electronic hub device 12. In an example, the radio sub-system 26 is a standalone receiver of radio signals such as WiFi, FM, AM, Bluetooth™ and Digital TV, for example, that is capable of down-converting, demodulating and decoding information transmitted by radio beacons 14. In this example, the standalone receiver may be realized using discrete components or using minimum hardware such as SDRs.

The antenna 30 may be a single mechanically steered directional antenna or may include multiple directional antennas, as shown in FIG. 2. When the antenna 30 includes multiple directional antennas, any number of antennas that fit within the physical limitations of the electronic hub device 12 may be included. In an example in which multiple directional antennas are included, the antenna switch 28 may be operated to select a subset of the multiple directional antennas to receive the radio beacon signals from the radio beacons 14. A single antenna or a set of antennas may be selected at a time to receive radio beacon signals from one direction or a set of directions, respectively. In an example, the electronic hub devices 12 include six directional antennas. The directional antennas may be patch antennas or another type of antenna.

The electronic hub devices 12 are capable of determining the orientation of their antennas 30 relative to the orientation of antennas 30 of other electronic hub devices 12 such that relative orientation of the electronic hub devices 12 is known. A method of determining orientations of electronic hub devices 12 relative to one another is described herein.

The electronic hub device 12 is powered by a power supply 36, which communicates with the main processor sub-system 16 via a power interface 32. In an example, the power supply 36 is one or more batteries. In another example, the power supply 36 is an electrical outlet.

The radio beacon 14 may be any type of radio signal transmitting device. All of the radio beacons 14 of the beacon location system 10 may be the same type of device, or alternatively, one or more of the radio beacons 14 may be a different type of device. Example radio beacons 14 that may be used with the radio beacon location system 10 include iBeacon™, Eddystone™ and BLE radio beacons manufactured by LSR, Estimote, BlueSense and Fathom, for example. Referring back to FIG. 1, the radio beacons are identified as radio beacon A, radio beacon B and radio beacon C for the purpose of this description. Locations of the radio beacons 14 are $X_A, Y_A, Z_A, X_B, Y_B, Z_B$ and $X_C, Y_C, Z_C$, respectively. At initial deployment and when moved, the locations of the radio beacons 14 are unknown.

Figure 3:
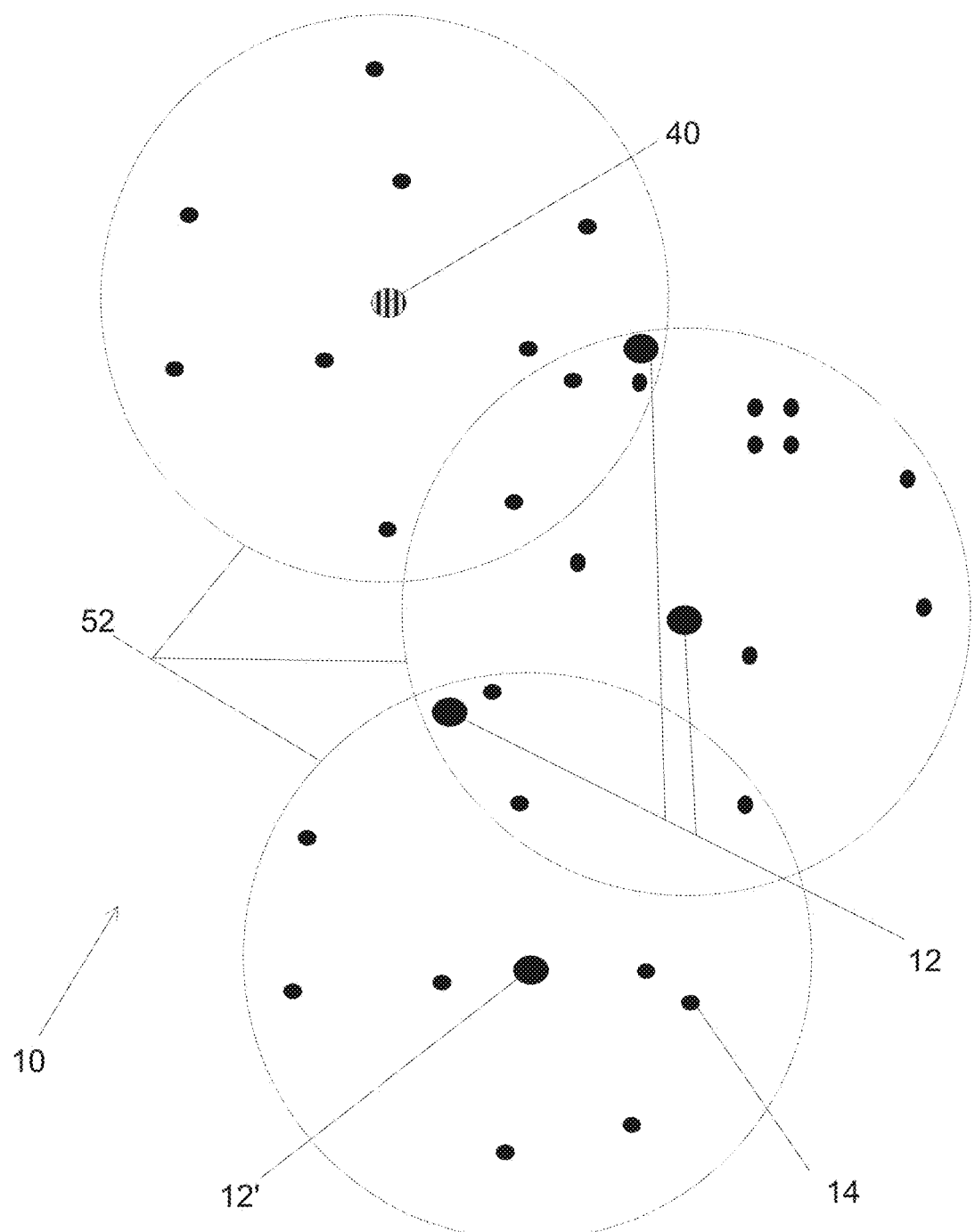
FIG. 3 is a schematic diagram of a deployed beacon location system according to an example.

The beacon location system 10 may further include nodes 40, as shown in FIG. 3. Nodes 40 are similar to radio beacons 14, however, are able to receive radio signals from radio beacons 14 and pass the information on to electronic hub devices 12. Coverage areas 52 over which the electronic hub devices 12 and the node 40 are able to receive beacon signals from the radio beacons 14 are shown. As will be described with respect to the method of determining orientations of electronic hub devices 12, the electronic hub devices 12 are within the coverage area of at least one other electronic hub device 12 in order to receive radio beacon signals therefrom.

Figure 4:
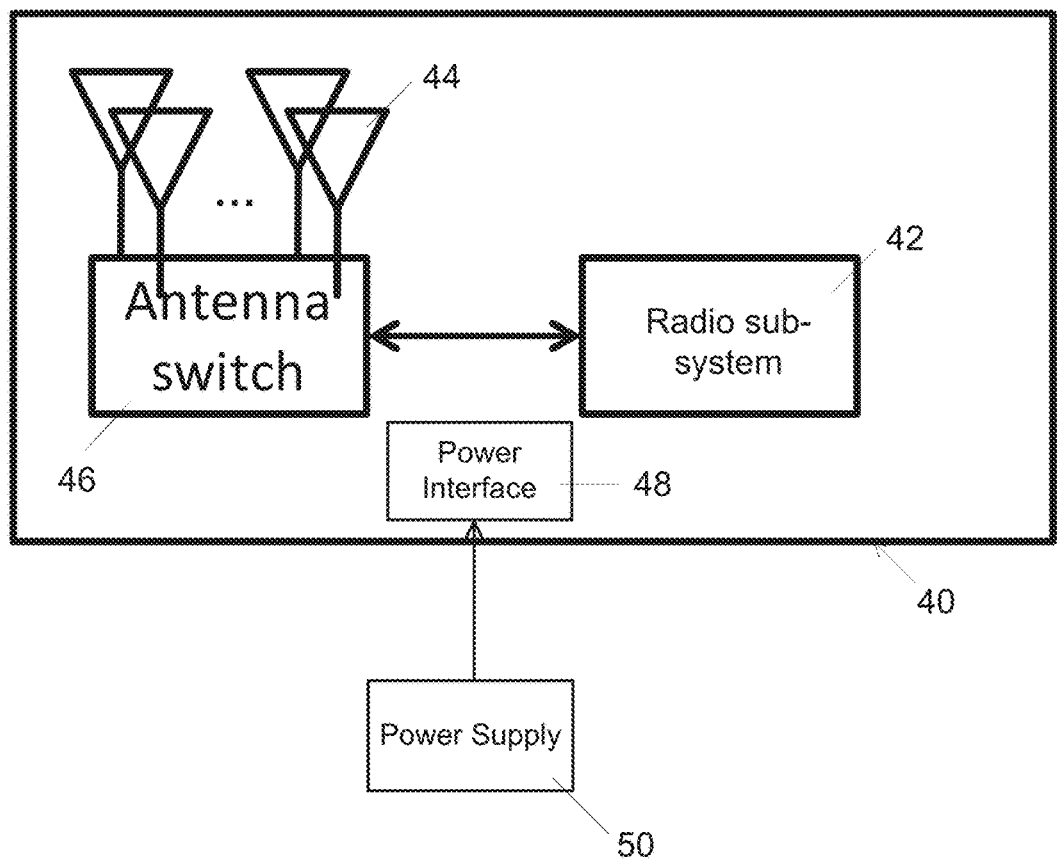
FIG. 4 is a schematic diagram of a node according to an example.

Referring to FIG. 4, an example node 40 is shown. Radio sub-system 42 of the node 40 receives radio beacon signals from the radio beacons 14 via an antenna 44 and generates digitized data representing received signal strengths of the radio beacon signals received at the node 40 at the multiple orientations. The radio sub-system 42 communicates with an antenna switch 46 that controls the antenna 44 of the node 40. Radio sub-system 42 also functions as a transmitter to transmit beacon signals associated with the node 40 and transmit the digitized data for receipt at an electronic hub device 12. The antenna 44 and the radio sub-system 42 are similar as those described in relation to the electronic hub device 12 and will not be described further here. The node 40 is powered by a power supply 50, which communicates with the node 40 via a power interface 48. In an example, the power supply 50 is one or more batteries. The nodes 40 function to extend a total coverage area by the beacon location system 10.

Nodes 40 may be employed to improve accuracy of radio beacon locations that are within a detectable distance of both a node 40 and an electronic hub device 12. Nodes 40 may also be employed to determine locations of radio beacons 14 that are not detectable by the electronic hub devices 12. Radio beacons 14 may be undetectable due to being deployed at a large distance from the electronic hub device 12 or due to large or multiple obstacles being located between the radio beacons 14 and the electronic hub device 12. In general, nodes 40 function to increase the range of the beacon location system 10 without adding additional electronic hub devices 12. Because the hardware of the nodes 40 does not include a main processor system and, in this example, a GNSS receiver and GNSS sub-system, nodes 40 are less costly to manufacture than electronic hub devices 12. Therefore, including nodes 40 in the beacon location system 10 rather than additional electronic hub devices 12 may decrease the overall cost of the radio beacon location system 10 while maintaining or increasing a coverage area thereof.

Figure 5:
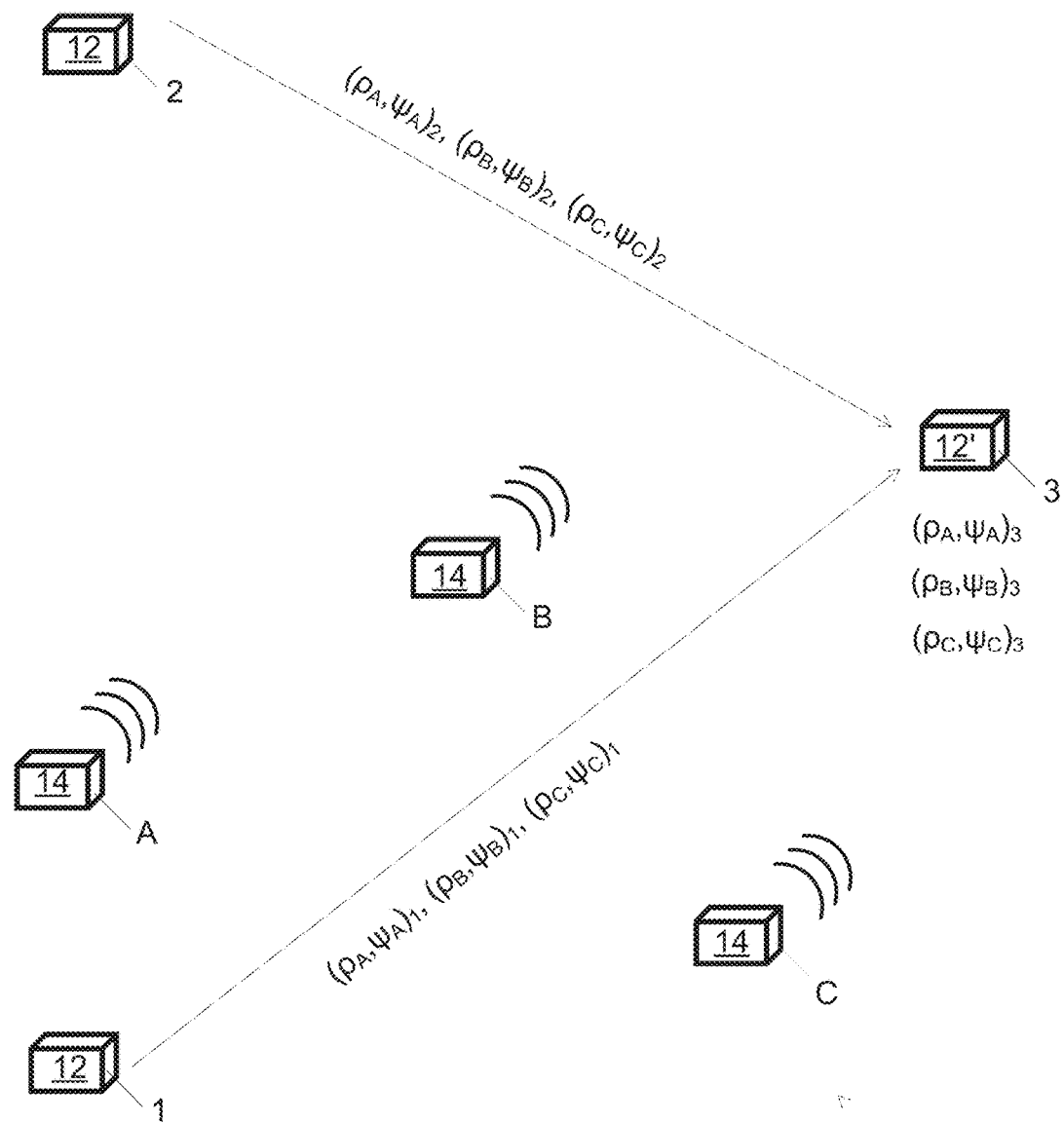
FIG. 5 is a schematic diagram of electronic hub devices and radio beacons of a radio beacon location system according to another example.

Referring back to FIG. 3, the coverage areas 52 of the node 40 and electronic hub devices 12 overlap as shown. When multiple electronic hub devices 12 are included in the beacon location system 10, in an example, one of the electronic hub devices 12 is assigned to be a master electronic hub device 12' as shown. Referring also to FIG. 5, the electronic hub devices 12 and the master electronic hub device 12' independently determine ranges (p) and angles of arrival (∢)) of the radio beacons 14 from which radio signals are received. These ranges and angles of arrival, which may be referred to as observations, are sent from the electronic hub devices 12 to the master electronic hub device 12'. The master electronic hub device 12' combines the observations received from the other electronic hub devices 12 with those determined locally to determine locations of the radio beacons 14. The observations received from other electronic hub devices 12 or generated locally at the master hub device 12' include the observations of radio beacons 14 located within the coverage areas 52 of the electronic hub devices 12 and the nodes 40. For radio beacon signals received at the nodes 40, the observations are mapped from the nodes 40 to the electronic hub devices 12 at which the digitized data was received after the nodes 40 have been located by the electronic hub devices 12. According to the example of FIG. 3, a subset of the radio beacons 14 are located within the coverage areas 52 of two electronic hub devices 12 or within the coverage areas 52 of the node 40 and the electronic hub devices 12 where the coverage areas thereof overlap. By calculating the locations of radio beacons 14 in which a subset of the radio beacons 14 are associated with observations from more than one electronic hub device 12, accuracy as well as reliability of the radio beacon locations may be improved. According to an example, at least three radio beacons 14 belong to the subset.

In deployments in which nodes 40 or more than one electronic hub device 12 is present, the radio sub-systems 42, 26 of the nodes 40 and electronic hub devices 12 operate in a switched mode in order to send the observations. In another example, a second radio sub-system is included in the nodes 40, electronic hub devices 12 or both to send the observations. Similar to the radio sub-systems 26, the second radio sub-system may send the observations using any of the radio signal types disclosed herein including: BLE (Bluetooth™ Low Energy), Bluetooth™, FM, AM, WiFi, Digital TV, ZigBee or 6LoWPan, for example.

As will be understood by those skilled in the art, the master electronic hub device 12' may be any one of the electronic hub devices 12 of the beacon location system 10. Alternatively, the master electronic hub device 12' may be different than the other electronic hub devices 12 of the beacon location system 10. The master electronic device 12' may be determined based on user input or may be automatically selected. For example, when one electronic hub device 12 is connected by a wired connection to server 38, this electronic hub device 12 may be assigned as the master hub device 12.

Determining the range of the radio beacons 14 and nodes 40 from the electronic hub devices 12 or determining the range of the radio beacons 14 from the nodes 40 includes generating radio propagation models that are specific to the environment in which the beacon location system 10 is deployed. The environment may be wide open with no obstacles present in the line of sight between the electronic hub devices 12, the nodes 40 and the radio beacons 14 or the environment may include one or more obstacles. Obstacles include: walls, furniture, electronic equipment, shipping containers, vehicles, rock formations and other objects, for example.

Figure 6:
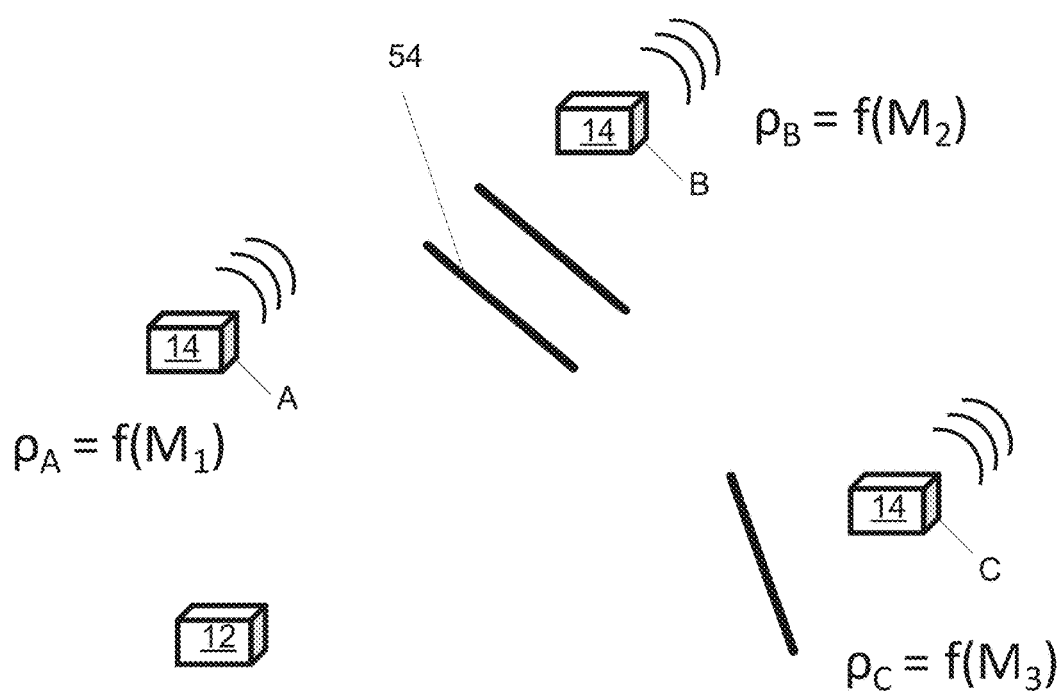
FIG. 6 is a schematic diagram of an electronic hub device and three radio beacons of a radio beacon location system in a deployment environment including obstacles.

Referring to FIG. 6, the distances $\rho_A$, $\rho_B$ and $\rho_C$ of the radio beacons A, B and C are a function of the propagation models, $M_1$, $M_2$ and $M_3$, respectively. When no obstacles are present between the electronic hub device 12 and the radio beacons 14, the radio propagation models map the received signal strength of the radio beacons 14 to physical distances of the radio beacons 14 from the electronic hub device 12 using a free space radio propagation model. When obstacles are present, such as walls 54, for example, environmental details, which are associated with respective orientations of the antenna 30, are used to refine the radio propagation models. The environmental details may be known, such as when a venue map of the deployment location is available, for example, or the environmental details may be predicted by the beacon location system 10.

In examples in which a venue map is available, propagation models that are specific to the different antenna orientations from the location of the electronic hub device 12 and compensate for the environmental details on the venue map are determined. The environmental details may be relatively simple and include, for example, information about a number of walls 54 between the electronic hub device 12 and the radio beacon 14. The environmental details may be relatively complex and include, for example, information about obstacle material, thickness and physical location. The radio propagation models are stored in memory 20 and may be stored in association with the different orientations of the antenna 30 or may be stored in association with identifiers of the directional antennas.

Figure 7:
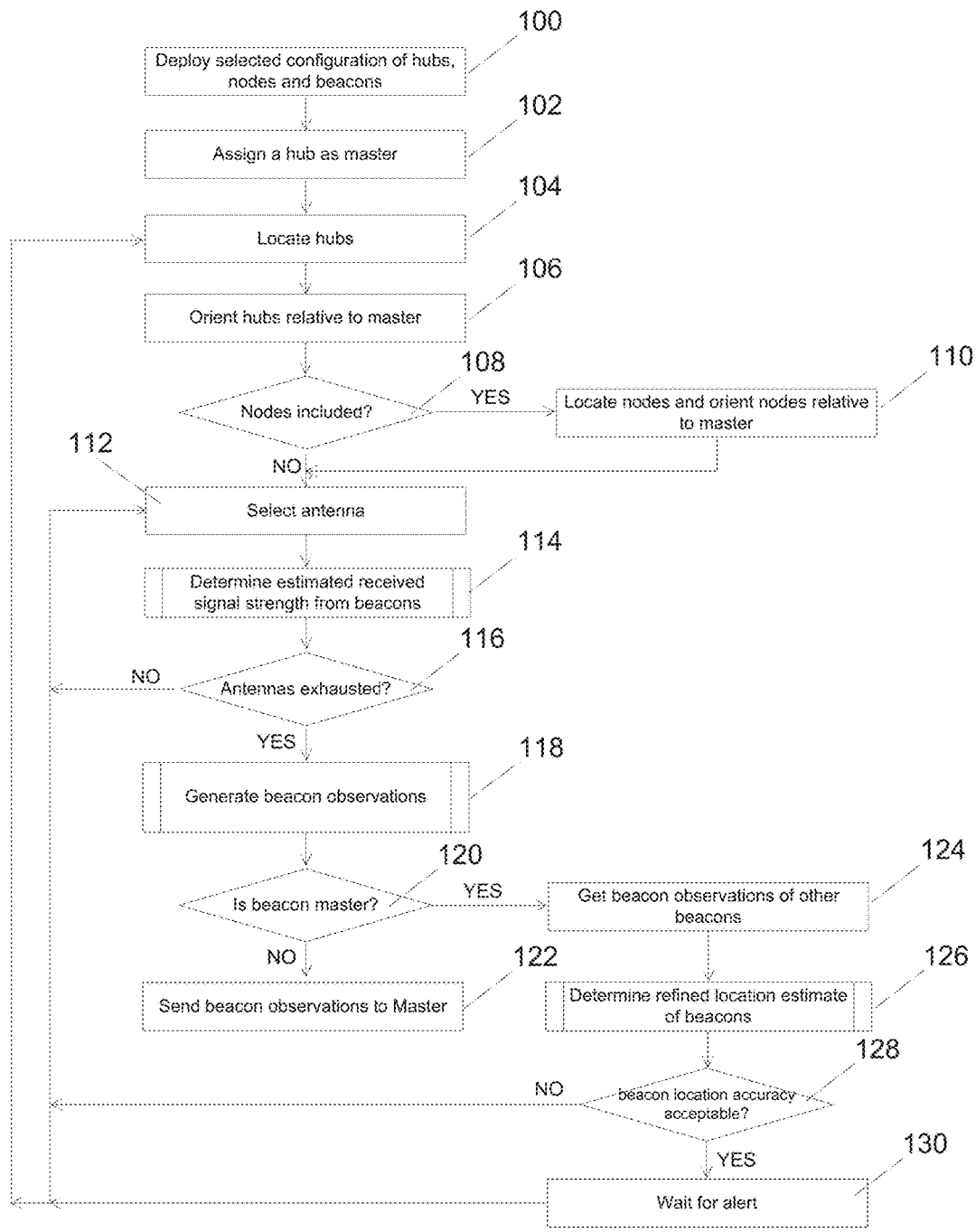
FIG. 7 is a flowchart depicting a method of determining locations of radio beacons of a beacon location system according to an example.

Referring to FIG. 7, a method of determining locations of radio beacons of a beacon location system 10 in a deployment environment is shown. Following deployment of a selected configuration of electronic hub devices 12, nodes 40 and radio beacons 14, at 100, in the deployment environment, one of the electronic hub devices 12 is assigned as master hub device 12', at 102. Locations of the electronic hub devices 12, 12' of the location system are then determined using one of the previously described methods and stored in memories 20 of the electronic hub devices 12, 12', at 104. In an example, location of the electronic hub devices 12, 12' includes a validity check that compares the locations of the electronic hub devices 12, 12' to known boundaries of the deployment environment in order to determine if one or more of the locations is not in an expected location. Alternatively, the validity check may compare the locations of the electronic hub devices 12, 12' to one another in order to detect obvious errors, such as one of the electronic hub devices 12, 12' being located in a different city, for example. Following location of the electronic hub devices 12, at 106, orientations of others of the electronic hub devices 12 are determined relative to the master hub device 12' and stored in the memory 20 of the master hub device 12'. The method of orientation will be described later with reference to FIGS. 17 and 18. It is then determined if nodes 40 are included in the deployed system, at 108. If there are nodes 40, locations and orientations of the nodes 40 relative to the master hub device 12' are determined, at 110. At 112, radio beacon signals from the radio beacons are received at antennas of the electronic hub devices 12, 12' at multiple orientations relative to the electronic hub devices 12, 12'. Radio sub-systems 26 of the electronic hub devices 12, 12' in communication with the antennas 30 generate digitized data representing received signal strengths of received radio beacon signals at the multiple orientations for the electronic hub devices 12, 12'. Radio beacon signals from a subset of the radio beacons 14 are received by more than one electronic hub device 12, 12' or node 40. The estimated received signal strength is determined, at 114, using the method of determining estimated received signal strength of FIG. 8. When estimated received signal strength has been determined for all antennas, or antenna orientations, of all electronic hub devices 12, 12', at 116, the method continues and, at 118, beacon observations, which include angle of arrival of beacon signals and range of radio beacons 14 and associated uncertainties are determined. The angle of arrival is determined, at main processor systems 16 in communication with the radio sub-systems 26 of the electronic hub devices 12.

12', by identifying orientations of the antennas of the electronic hub devices 12, 12' corresponding to strongest ones of the received radio beacon signals, the subset of the radio beacons being associated with angles of arrival at different electronic hub devices 12, 12'. The ranges between the electronic hub devices 12, 12' and the radio beacons 14 are determined, at the main processor systems, by calculating refined received signal strengths based on gain patterns of the antennas of the electronic hub devices 12, 12' and applying a propagation loss model associated with the antenna orientation to the refined received signal strengths, the subset of the radio beacons 14 being associated with ranges from the different electronic hub devices 12, 12'. The method of determining angle of arrival will be described in more detail with reference to FIG. 10 and the method of estimating range will be described in more detail with reference to FIG. 11. At 120, it is determined if the electronic hub device 12, 12' at which the beacon observations are generated is the master hub device 12'. If the electronic hub device 12, 12' at which the beacon observations are generated is not the master hub device 12', the beacon observations are sent to the master hub device 12', at 122. If the electronic hub device 12, 12' at which the beacon observations are generated is the master hub device 12', the angles of arrival and the ranges determined at others of the electronic hub devices 12 are received at the master hub device 12', at 124, and combined, at 126, in an estimator with the angles of arrival and the ranges determined at the master hub device 12' to determine refined locations of the radio beacons 14 in the deployment environment. According to the method, others of the electronic hub devices 12 also function as radio beacons such that beacon observations of the electronic hub devices 12, 12' are also generated. The estimator determines refined location estimates of the beacons using a method of determining refined beacon location estimates, which will be described in more detail with reference to FIG. 9. After the refined location estimates have been determined, the accuracy of the refined location estimates is assessed, at 128. If the accuracy is not within a predetermined acceptable uncertainty, the method repeats to determine new beacon observations and the accuracy is assessed again after new refined location estimates are determined. If the accuracy is within a predetermined acceptable uncertainty, the method concludes until an alert is received, at 130. Acceptable accuracy may be achieved when the locations of the radio beacons 14 are within 1 meter of previously determined locations for those radio beacons 14. Alternatively, acceptable accuracy may be achieved when radio beacon locations converge within 1 standard deviation.

Alerts that trigger the determination of new beacon observations may be based on expiration of a time period such that the method is executed at set intervals in order to monitor the radio beacons 14, nodes 40 and electronic hub devices 12 and determine a new location for any radio beacons 14, nodes and electronic hub devices 12 that may have moved. The alert may, for example, be generated at 1 or 2 hour intervals in a retail environment and may be generated at 5 to 30 minute intervals in a manufacturing environment in which radio beacons 14 may move more frequently due to manufacturing processes that move materials and equipment frequently. In response to a time-based alert, the radio beacon locations may be determined by repeating the method from 112 or the electronic hub devices 12, 12' may self-locate and self-orient and the beacon locations may be determined by repeating the method from 64.

The alerts may also or alternatively be based on sensor information received relating to an electronic hub device 12, a node 40 or a radio beacon 14. For example, inertial sensors, such as accelerometers, may be included in the radio beacons 14, nodes 40 and electronic hub devices 12, the sensor information sent to the master hub device 12' at which changes may be detected. Further, the alerts may be generated in response to validity checks that check for obvious errors returning invalid results, such as the validity check that may be performed in relation to electronic hub device 12, 12' self-location, for example.

Figure 13:
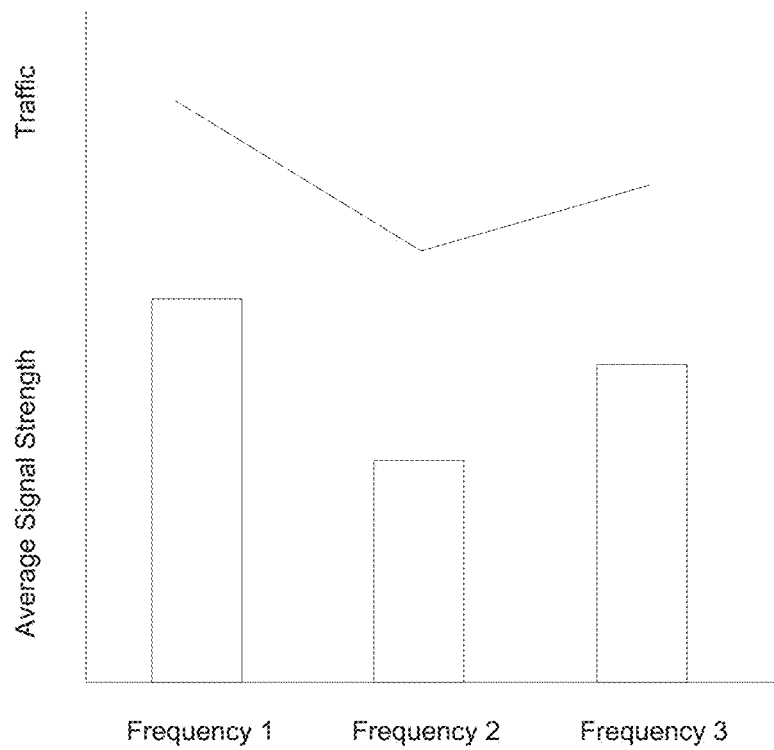
FIG. 13 is a graph depicting the average received signal strength for a radio beacon with three transmission frequencies.

Referring back to FIG. 8, estimated received signal strength of radio beacons 14 is determined by selecting a data sample from multiple radio beacon signals over a period of time, at 132. At 134, a frequency with least traffic is identified by identifying a number of radio beacons 14 simultaneously transmitting over the same frequency for all of the transmission frequencies that are in use. The radio beacons 14 are identified based on unique IDs included in the radio beacon signals and the overall transmit power of those radio beacons 14. The transmit power of the respective radio beacons 14 is determined based on the manufacturer's ID, which is received in the radio beacon signals from the radio beacons 14. At 136, a received signal strength of the identified frequency is selected and, at 138, the selected received signal strength is weighed based on traffic volume. At 140, when the data sample is exhausted, a weighted average of the selected received signals strengths and associated uncertainty is calculated, at 142 and 144. Referring to FIG. 13, a radio beacon 14 having three transmission frequencies has the least traffic on frequency 2, as shown.

Figure 8:
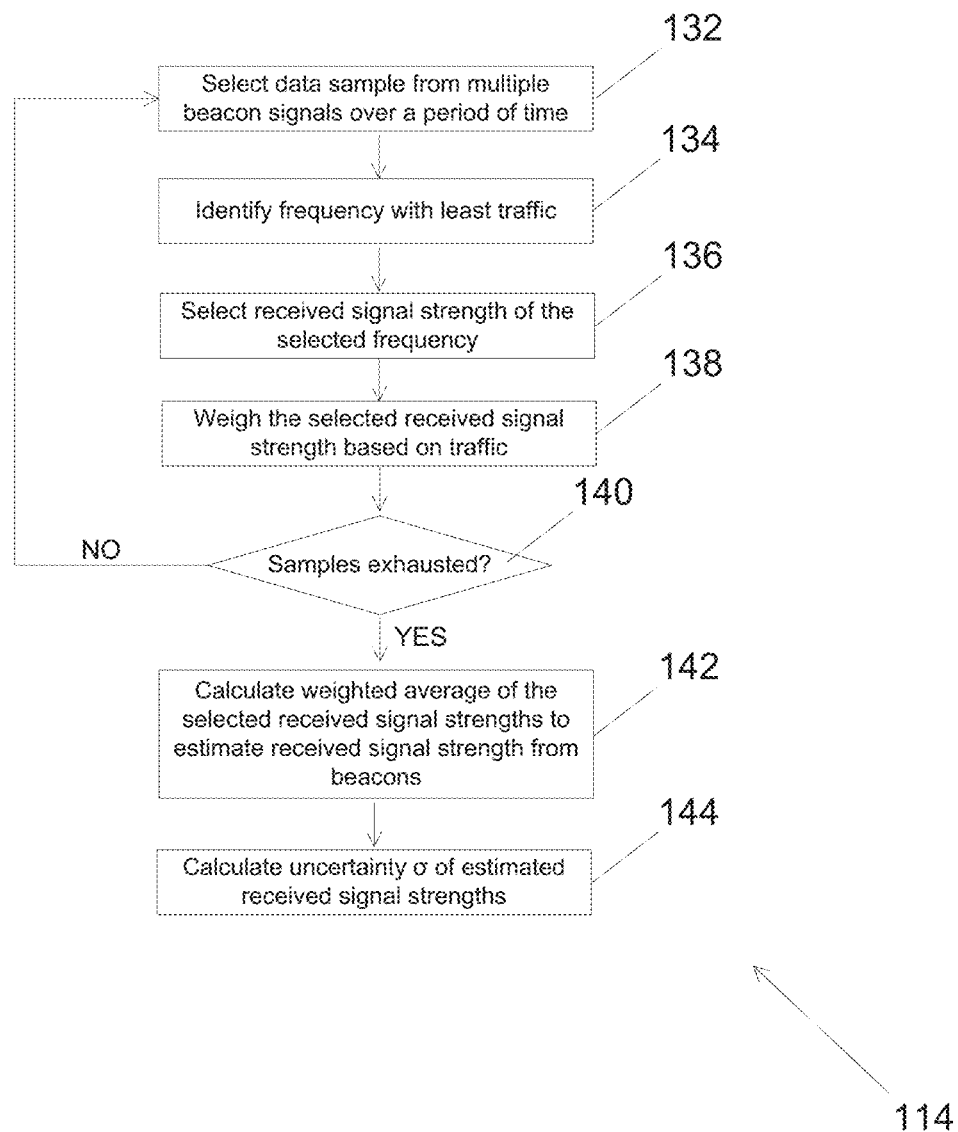
FIG. 8 is a flowchart depicting a method of estimating received signal strength from radio beacons according to an example.

The method of FIG. 8 is performed for radio beacons 14 that transmit signals on two or more frequencies, such as BLE devices and WiFi devices, for example, which cycle between three and fourteen transmission frequencies, respectively. As will be understood by persons skilled in the art, radio beacon signals received at the frequency having the least traffic are the least affected by noise. Instead of performing the method of FIG. 8, the estimated received signal strength may alternatively be determined by selecting a default frequency of the two or more frequencies. According to an example, the default frequency selected for BLE radio signals is the frequency associated with channel 39. Traffic volume on channel 39 is often less than the traffic volume on other BLE channels because there is no frequency overlap with WiFi radio signals. For electronic hub devices 12 having antennas 30 tuned to the default frequency or for radio beacons 14 that transmit on a single frequency, the estimated received signal strength is determined by averaging received signal strengths over a selected period of time.

Figure 9:
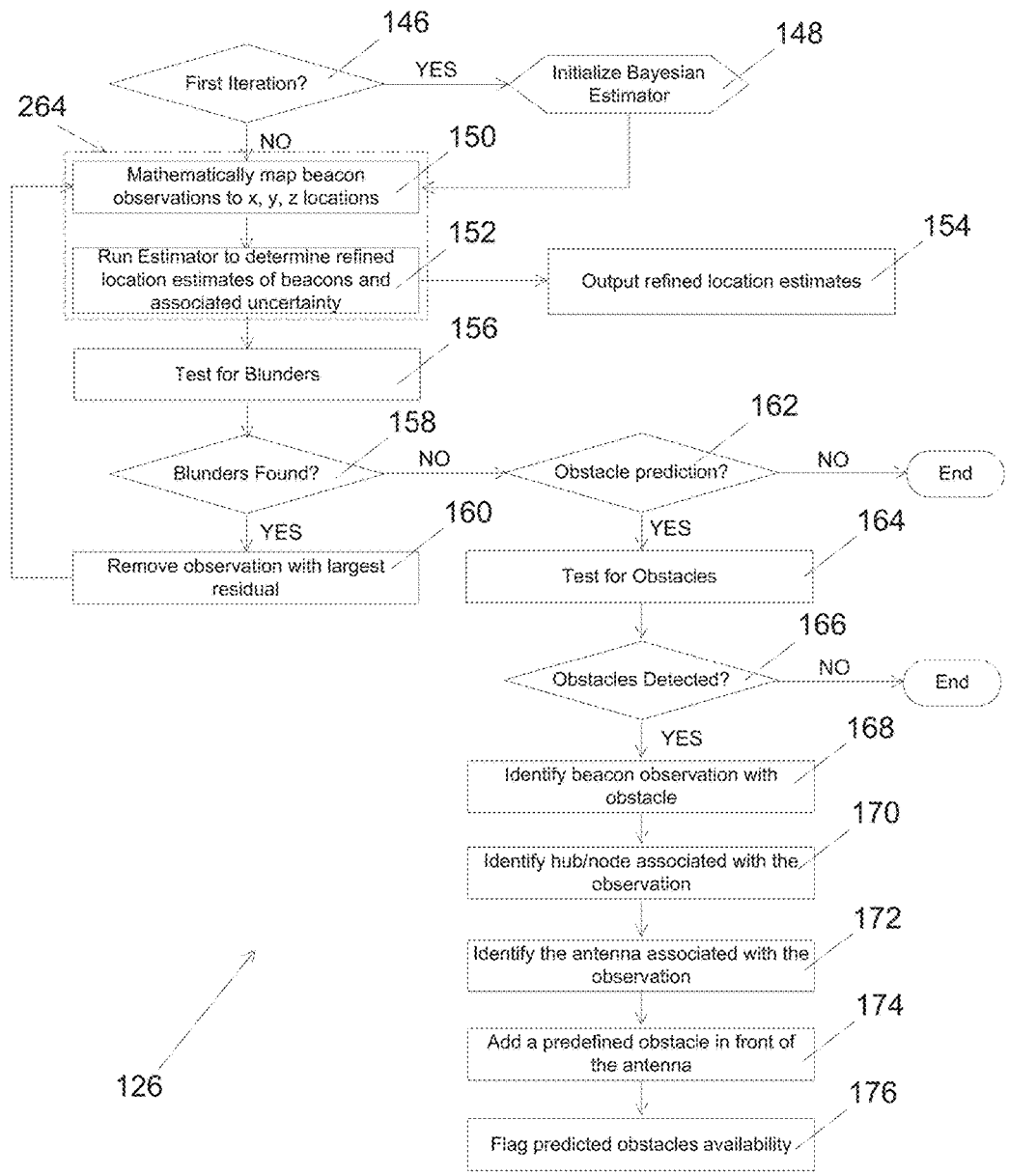
FIG. 9 is a flowchart depicting a method of determining refined location estimate of radio beacons according to an example.

Turning now to FIG. 9, the refined location estimates are determined using an estimator, such as a Bayesian estimator, for example. As shown, the estimator is initialized, at 148, if it is the first iteration of the method, 146. At 150, the beacon observations are mathematically mapped to x, y, z locations in the deployment environment. At 152, the estimator is run to determine refined location estimates of beacon locations and associated uncertainty. As indicated by 264, 150 and 152 may be replaced by another estimation method, which will be described with respect to FIG. 22. At 154, the refined location estimates are output. The refined location estimates may be output to a database, for example. The refined location estimates may be monitored by an operator using an output device, such as a computer terminal, for example. Residuals are then tested for blunders, at 156. If blunders are found, 158, the observation with the largest residual is removed, at 160. This part of the method is iterative to re-run the estimator, at 152, with the blunders removed in order to improve the accuracy of the refined location estimates. If no blunders are found at 156, it is determined whether or not to perform obstacle prediction, at 162. If no obstacle prediction is to be performed, the method ends. If obstacle prediction is to be performed, residuals are tested for obstacles, at 164. If obstacles are detected, at 166, the beacon observation associated with the obstacle is identified, the electronic hub device, 12, 12' or node 40 associated with the observation is identified and the antenna, or antenna orientation, associated with the observation is identified, at 168, 170 and 172, respectively. A predicted obstacle is then added in front of the antenna, at 174, and predicted obstacles availability is flagged, at 176.

Figure 10:
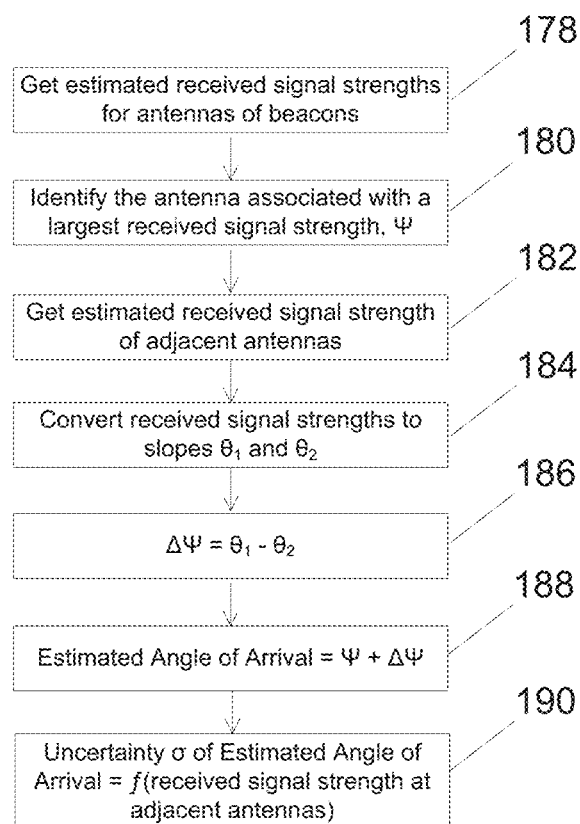
FIG. 10 is a flowchart depicting a method of determining angles of arrival according to an example.
Figure 14:
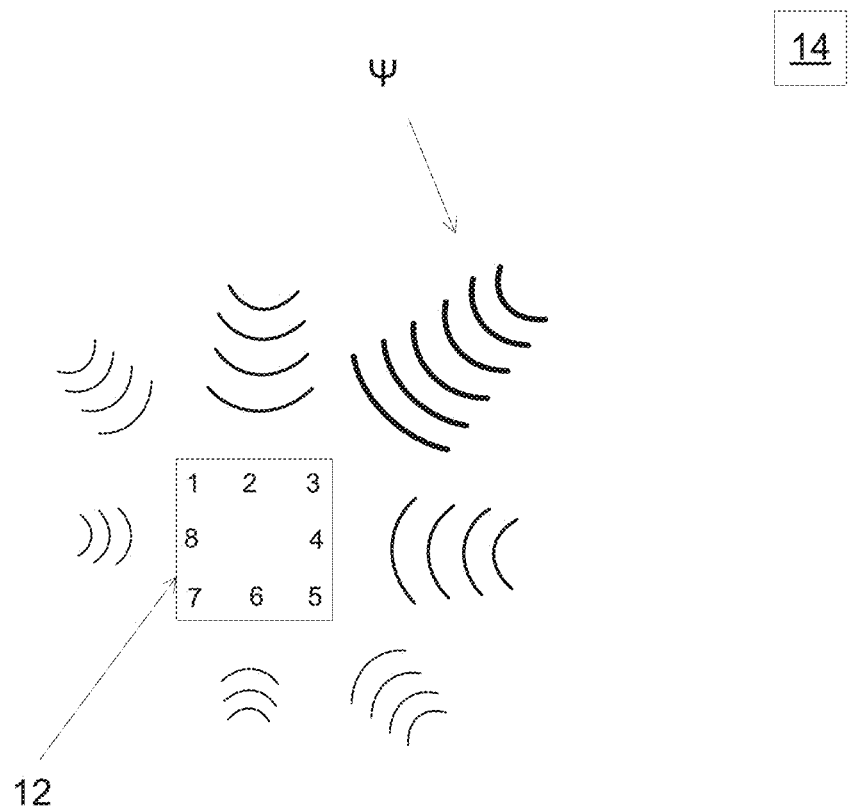
FIG. 14 is a schematic diagram depicting signal strength of signals received at different antenna orientations of the electronic hub device of FIG. 1.
Figure 15A:
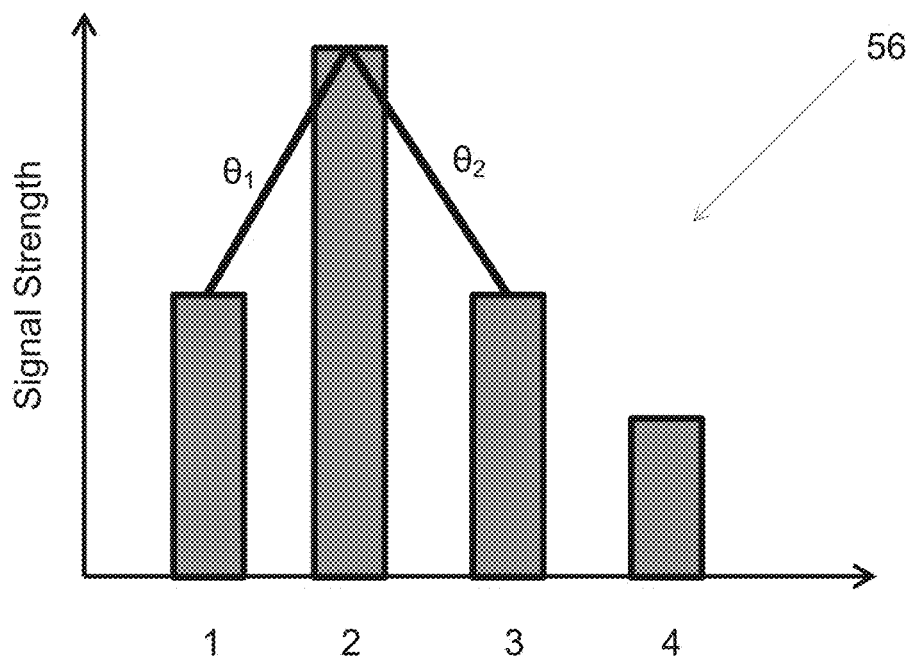
FIG. 15A is a graph depicting strengths of radio beacon signals received at different antenna orientations of an electronic hub device according to an example.
Figure 15B:
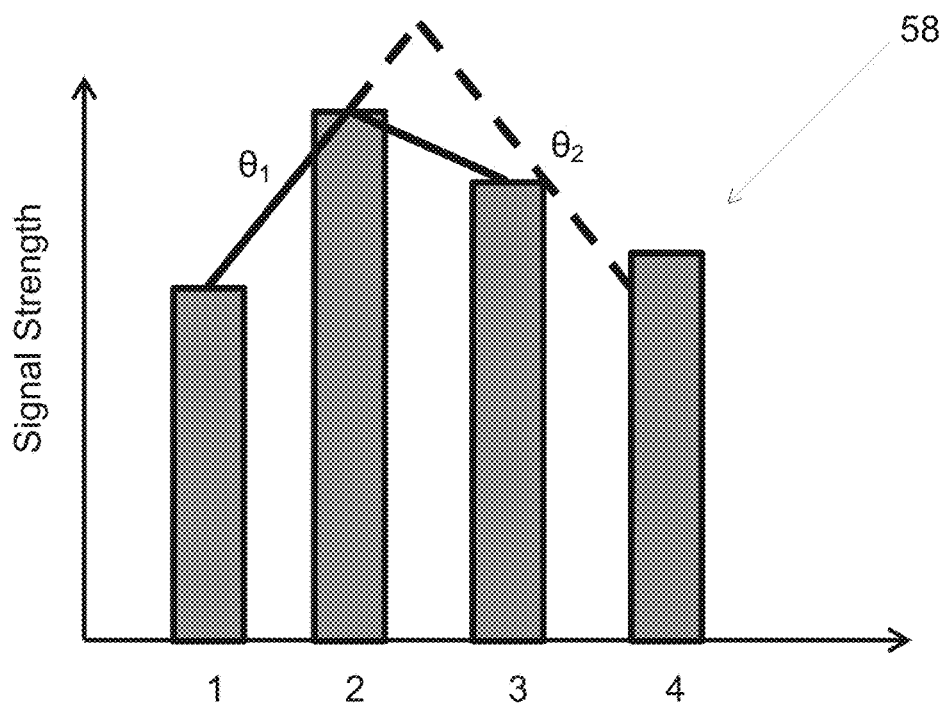
FIG. 15B is another graph depicting strengths of radio beacon signals received at different antenna orientations of an electronic hub device according to an example.

Referring to FIG. 10, the method of estimating an angle of arrival of beacon signals will now be described. According to the method, the estimated received signal strengths for the antennas of the beacons determined using the method of FIG. 8 are retrieved and the antenna associated with a largest received signal strength ($\psi$) is determined, at 178 and 180. Estimated received signal strengths of adjacent antennas are then obtained, at 182. According to the example of FIG. 10, the estimated received signal strengths of adjacent antennas are converted to slopes $\theta_1$ and $\theta_2$, at 184 and a line equation (slope intercept form) is used to determine $\Delta\psi=\theta_1-\theta_2$, at 186. The estimated angle of arrival is calculated by adding $\Delta\psi$ to the largest received signal strength, at 188. The uncertainty of the estimated angle of arrival is calculated as a function of the received signal strength at the adjacent antennas, at 190. Referring to FIG. 14, signal strength at different antenna orientations of an electronic hub device 12 is depicted. As shown, the electronic hub device 12 of the example shown is capable of receiving signals in eight different orientations, with a strongest received signal being received at orientation three, which corresponds to the location of the radio beacon 14 from which the beacon signals originate. Referring also to FIGS. 15A and 15B, examples of implementation of the method of FIG. 10 are shown. In FIG. 15A, the bar graph 56 shows that the estimated received signal strengths of the adjacent antennas are approximately equal. Therefore, the largest received signal strength is directly associated with orientation two. In FIG. 15B, the bar graph 58 shows that no symmetry exists between the received radio beacon signal strengths at the different orientations of the antenna 30. In this example, the method of FIG. 10 determines that the angle of arrival is between orientations two and three.

Figure 11:
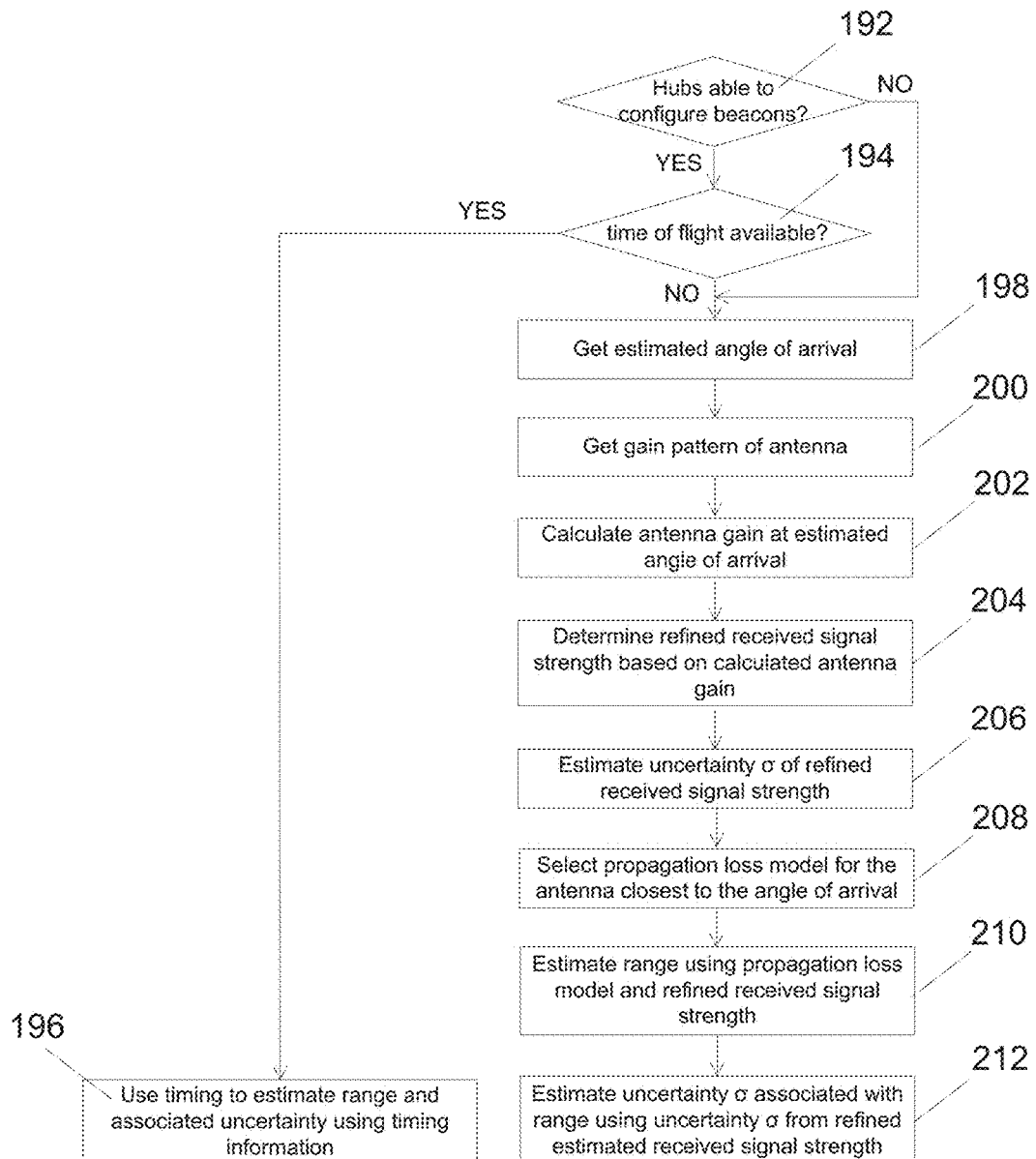
FIG. 11 is a flowchart depicting a method of estimating range according to an example.
Figure 12:
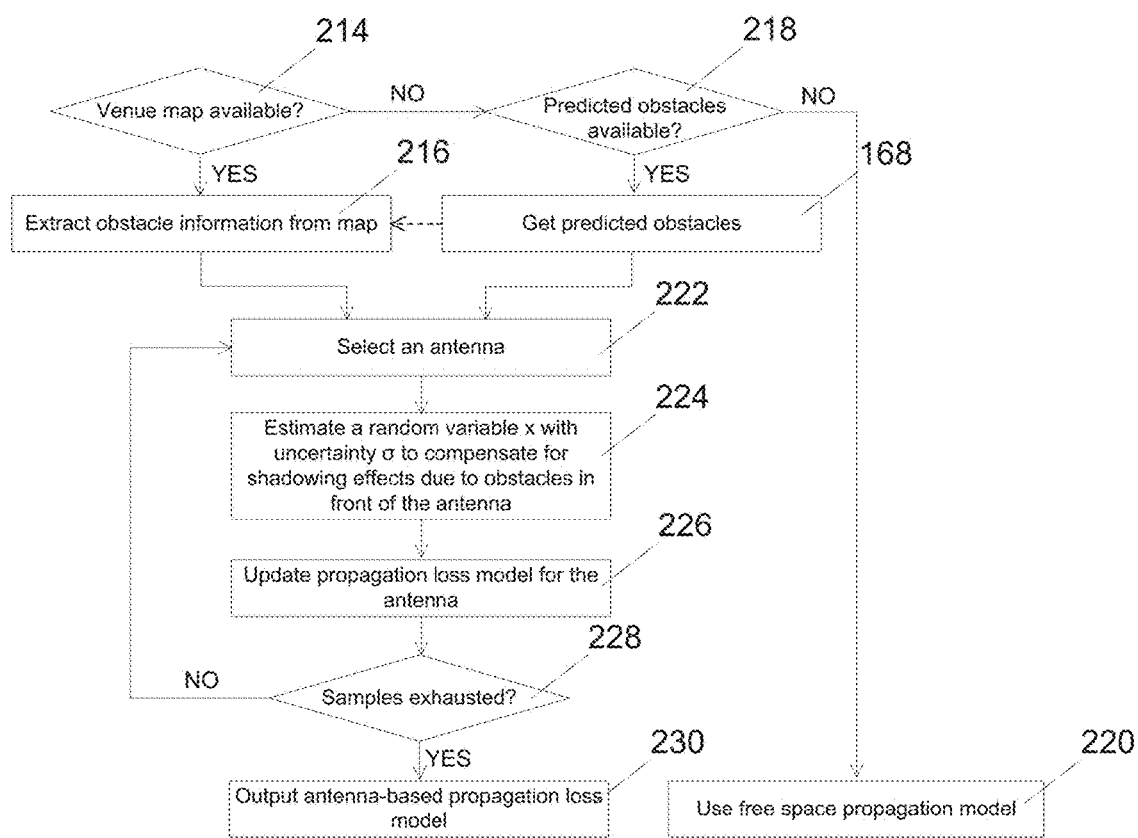
FIG. 12 is a flowchart depicting a method of refining a propagation loss model according to an example.

In order to estimate range of the radio beacon 14 with respect to the electronic hub device 12, 12' or node 40 at which the beacon signals were received, a method of estimating range is performed, as shown in FIG. 11. At 192, it is determined if the radio beacons 14 are configurable by the electronic hub devices 12, 12'. If yes, it is determined if range is to be determined using time of flight, at 194. If yes, the range and associated uncertainty is determined using timing information between synchronized electronic hub devices 12, 12' and radio beacons 14, at 196. If the electronic hub devices 12, 12' are unable to configure the radio beacons 14, or if information for time of flight range determination is not available, an estimated angle of arrival at which the beacon signals are received is retrieved from memory 20 of the electronic hub device 12, 12' for the radio beacons 14, at 198. At 200, an antenna gain pattern is retrieved. The antenna gain pattern is specific to the antenna 30 and is known based on the type of antennas used by the electronic hub devices 12, 12' and nodes 40. At 202, an antenna gain is estimated at the angle of arrival. At 204 and 206, a refined signal strength is determined based on the estimated received signal strength and the calculated antenna gain and an uncertainty of the refined signal strength is estimated. As will be understood by persons skilled in the art, when the angle of arrival is directly aligned with the antenna, the normalized antenna gain will be one. When the angle of arrival is not directly aligned with the antenna, the normalized antenna gain will be less than one such that the refined signal strength is greater than the estimated received signal strength. At 208, a propagation loss model is selected using a method of selecting a propagation model, which is shown in FIG. 12. Following selection of a propagation model, range and uncertainty associated with the range are estimated using the refined received signal strength and the propagation model, at 210 and 212.

Referring now to FIG. 12, a method of refining a propagation loss model will be described. At 214, it is determined if there is a venue map of the deployment environment available. If yes, obstacle information is extracted from the map, at 216, using an image processing method, for example, when the venue map is an image or another method for other venue map file formats. If there is no venue map available, it is determined whether or not predicted obstacles are available, at 218. If there are no predicted obstacles available, the propagation loss model used to determine range is a free space propagation model, at 220. If predicted obstacles are available, the predicted obstacles are retrieved from memory of the electronic hub device 12, 12'. As indicated by the dashed arrow in FIG. 12, predicted obstacles and venue map obstacles may both be included in the same propagation loss mode. The method of refining a propagation loss model continues, at 222, for all of the antenna orientations of the electronic hub devices 12, 12' and nodes 40, a random variable x with an uncertainty a is estimated to compensate for shadowing effects due to obstacles in front of the antenna, at 224. The propagation models are then updated, at 226, for the antenna orientations. This part of the method is repeated, as indicated at 228, until propagation models have been determined for all antenna orientations of the electronic hub devices 12, 12' that have obstacles associated therewith. The antenna-based propagation models are then output, at 230, for use at 208 of the method of estimating range of FIG. 11.

Although the method of determining locations of radio beacons 14 of a beacon location system 10 in a deployment environment is described as being performed with respect to all antenna orientations of all electronic hub devices, 12, 12' and nodes 40, it is possible to perform the method using only a subset of all antenna orientations or a subset of all electronic hub devices, 12, 12' and nodes 40. For example, when an electronic device hub 12, 12' or node 40 is deployed near an edge of a deployment environment, the antenna orientations facing away from the deployment environment may be excluded from the subset. By excluding the antenna orientations that are not directed toward radio beacons 14, processing time and the possibility of blunders may be reduced.

The method of determining locations of radio beacons 14 of a beacon location system 10 in a deployment environment may be performed by the main processor system 16 of the electronic hub devices 12, 12' by executing one or more software applications that are stored in memory 20 as computer readable code. Alternatively, the method may be performed by dedicated hardware of the main processor system 16, such as Application Specific Integrated Circuit (ASIC) or Graphics Processing Unit (GPU), for example, or by a combination of hardware and software. Parts of the method may alternatively be performed at one or more remote servers 38 in communication with the electronic hub devices 12, 12'. The method of determining refined location estimates of radio beacons 14 is performed at the master hub device 12' in communication with one or more remote servers 38. More than one master hub device 12 may be assigned. In another example, no master hub device 12' is assigned and the processing to determine locations of radio beacons 14 is distributed across the electronic hub devices 12 of the beacon location system 10. In an example, the electronic hub devices 12 send the digitized data representing received signal strengths of received radio beacon signals at the multiple orientations to the one or more remote servers 38 for processing. In another example, observations may be determined locally at the electronic hub devices 12 and then sent to the one or more remote servers 38 to determine refined location estimates of the radio beacons 14.

Figure 16:
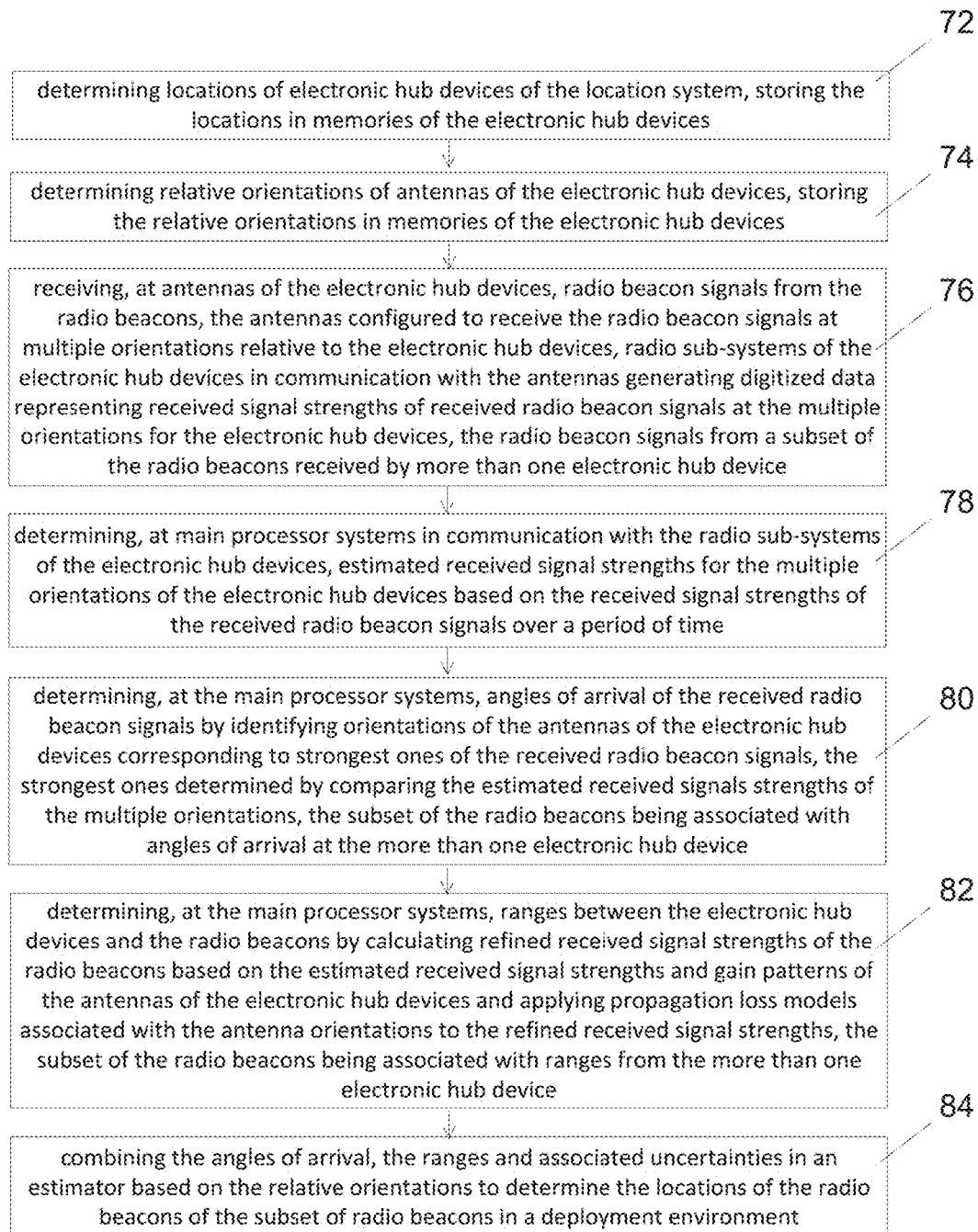
FIG. 16 is a flowchart depicting a method of determining locations of radio beacons according to another example.

Another example of a method of determining locations of radio beacons in a deployment environment is shown in FIG. 16. The method includes: at 72, determining locations of electronic hub devices 12 of the location system 10 and storing the locations in memories 20 of the electronic hub devices 12, at 74, determining relative orientations of antennas 30 of the electronic hub devices 12, storing the relative orientations in memories of the electronic hub devices 12, at 76, receiving, at antennas 30 of the electronic hub devices 12, radio beacon signals from the radio beacons 14, the antennas 30 configured to receive the radio beacon signals at multiple orientations relative to the electronic hub devices 12, radio sub-systems 26 of the electronic hub devices 12 in communication with the antennas 30 generating digitized data representing received signal strengths of received radio beacon signals at the multiple orientations for the electronic hub devices 12, the radio beacon signals from a subset of the radio beacons 14 received by more than one electronic hub device 12, at 78, determining, at main processor systems 16 in communication with the radio sub-systems 26 of the electronic hub devices 12, estimated received signal strengths for the multiple orientations of the electronic hub devices 12 based on the received signal strengths of the received radio beacon signals over a period of time, at 80, determining, at the main processor systems 16, angles of arrival of the received radio beacon signals by identifying orientations of the antennas 30 of the electronic hub devices 12 corresponding to strongest ones of the received radio beacon signals, the strongest ones determined by comparing the estimated received signals strengths of the multiple orientations, the subset of the radio beacons 14 being associated with angles of arrival at the more than one electronic hub device 12, at 82, determining, at the main processor systems 16, ranges between the electronic hub devices 12 and the radio beacons 14 by calculating refined received signal strengths of the radio beacons 14 based on the estimated received signal strengths and gain patterns of the antennas 30 of the electronic hub devices 12 and applying propagation loss models associated with the antenna orientations to the refined received signal strengths, the subset of the radio beacons 14 being associated with ranges from the more than one electronic hub device 12 and, at 84, combining the angles of arrival, the ranges and associated uncertainties in an estimator based on the relative orientations to determine the locations of the radio beacons of the subset of radio beacons 14 in a deployment environment.

For the purpose of the description, the method of determining locations of radio beacons 14 of a beacon location system 10 in a deployment environment selects antennas sequentially to estimate received signal strength and refine propagation models, for example. It will be understood by a person skilled in the art that received signal strengths may be estimated for all antennas simultaneously for all electronic hub devices 12, 12' and nodes 40 or may be estimated at different times. Similarly, the propagation models may be determined simultaneously for all antennas 30 of all electronic hub devices 12, 12' and nodes 40.

Figure 17:
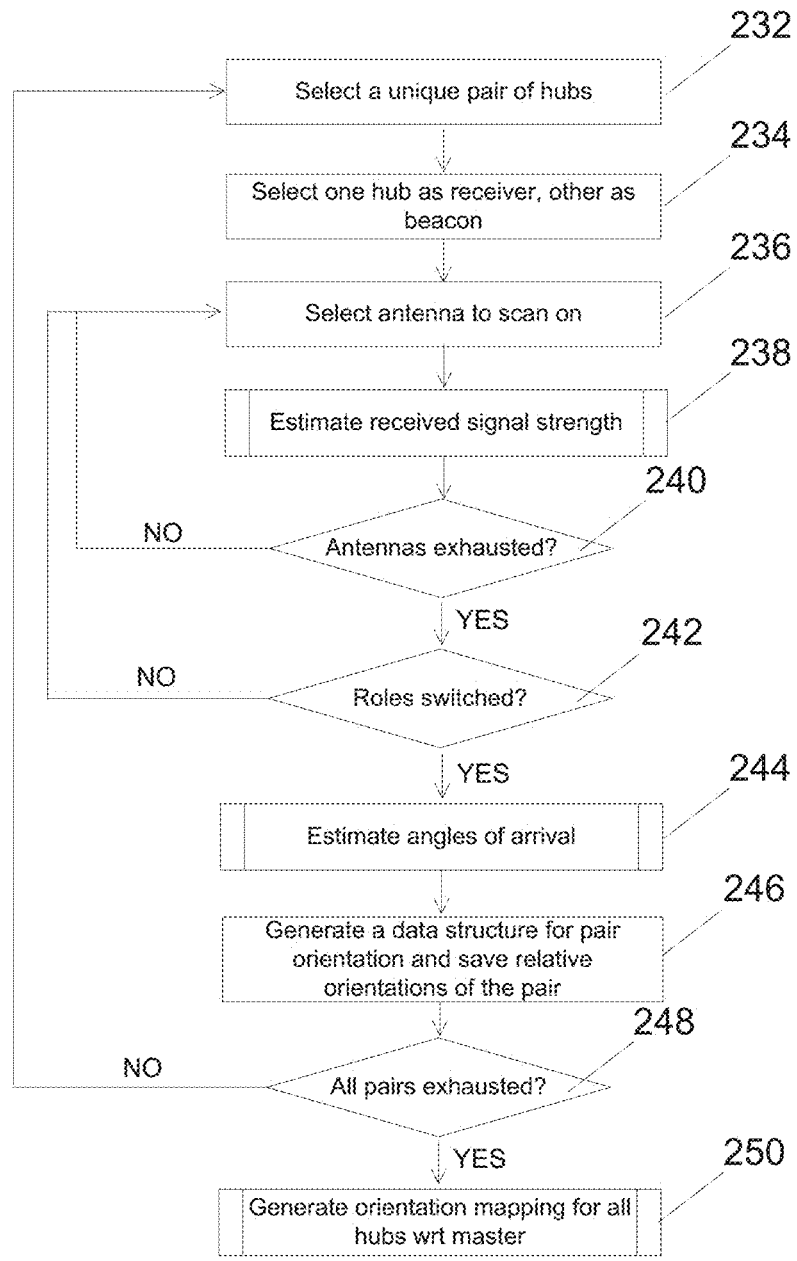
FIG. 17 is a flowchart depicting a method of orienting electronic hub devices relative to a master electronic hub device.
Figure 18:
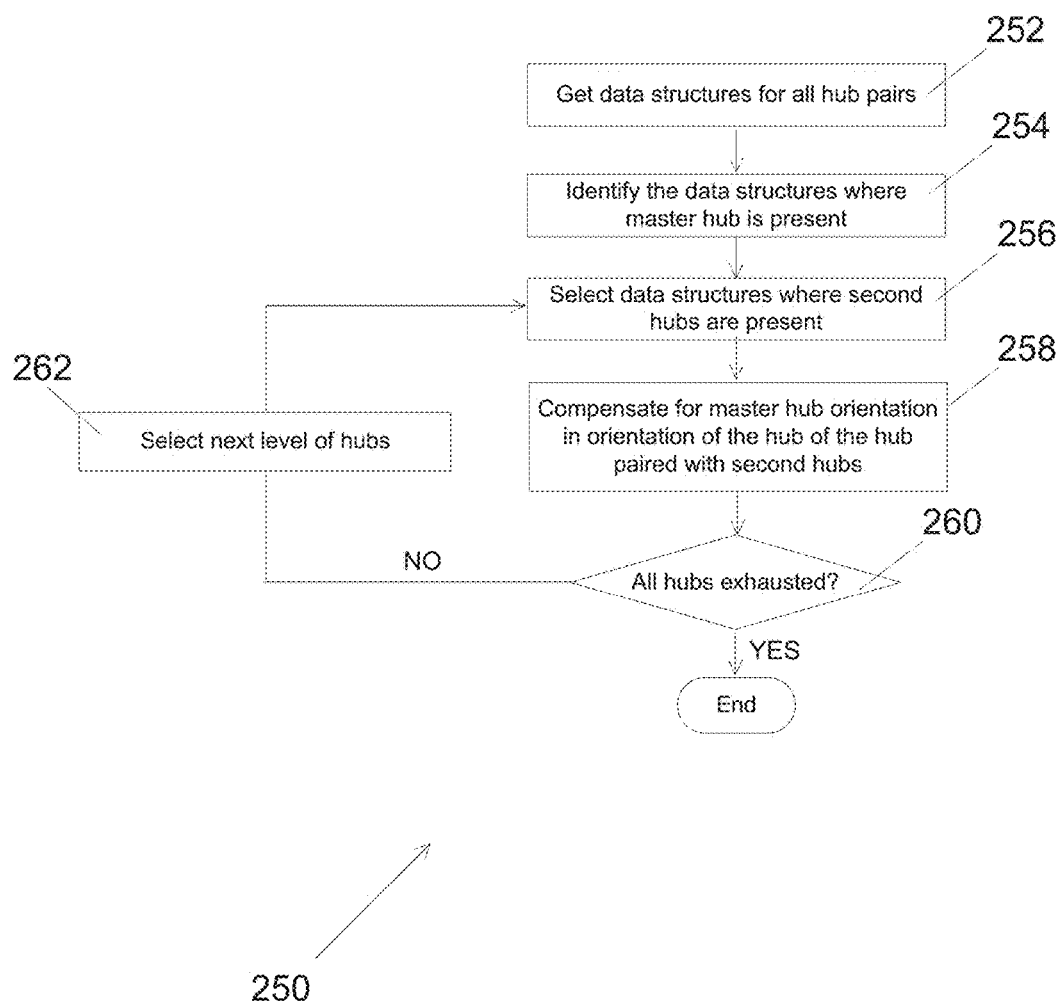
FIG. 18 is a flowchart depicting a method of generating orientation of all electronic hub devices relative to the master electronic hub device.

Referring to FIG. 17, a method of orienting electronic hub devices 12 relative to the master hub device 12' is shown. The method is repeated for all electronic hub device pair combinations. At 232, a unique pair of electronic hub devices 12, 12' is selected. At 234, one of the electronic hub devices 12, 12' is operated in a beacon mode and the other one of the electronic hub devices 12, 12' operated in a receiving mode. The electronic hub device 12, 12' operating in receiving mode then determine the estimated received signal strength of the electronic hub device 12, 12' at the different antenna orientations thereof, at 236, 238 and 240. The estimated received signal strength is determined in the same manner as has been described with respect to FIG. 8. At 242, the roles are switched so that the electronic hub device 12, 12' previously operating in receiving mode now operates in beacon mode and the electronic hub device 12, 12' previously operating in beacon mode now operates in receiving mode. After estimated received signal strength has been estimated for all antenna orientations of both devices 12, 12' of the pair, the angle of arrival is determined, at 244. The angle of arrival is determined according to the method of FIG. 10. A data structure for the pair orientation is then generated and relative orientations of the pair are saved in memory 20 of the electronic hub devices 12, 12' of the pair, at 246. The angles of arrival are determined for both devices 12, 12' of all pair combinations, as indicated at 248, and orientation mapping with respect to the master device is generated, at 250, according to the method of FIG. 18. As shown, the orientation mapping with respect to the master hub device 12' is achieved by identifying ones of the data structures of all pairs in which the master hub device 12' is included, at 252 and 254. The electronic hub devices 12 that are paired with the master hub device 12' in the data structures are referred to as second hubs. The data structures including the second hubs and electronic device hubs 12 other than the master hub device 12' are then identified, at 256. The orientation relative to the master hub device 12' is compensated for in the orientation of the electronic hub devices 12 paired with the second hubs, at 258, and repeated for a next level of electronic hub devices 12, at 262, which includes electronic hub devices 12 that are paired with the electronic hub devices 12 paired with the second hubs and so on until all an orientation of all electronic hub devices 12 with respect to the master hub device 12' has been determined, as indicated at 260.

According to the methods of determining locations of radio beacons 14 described herein, the angles of arrival and ranges and associated uncertainties are combined based on the relative orientations of the electronic hub devices 12. As described with respect to FIGS. 8, 10 and 11, uncertainties relating to estimated received signal strength, angle of arrival and range are determined when estimated received signal strength, angle of arrival and range, respectively, are determined. The relative orientations of the electronic hub devices 12 also include uncertainties associated therewith because determination of the relative orientations relies upon determination of estimated received signal strength and estimated angle of arrival, according to the method of FIG. 17.

When combined in an estimator, values with a high uncertainty associated therewith are relied upon less than values with a low uncertainty when estimating a solution. Because the angles of arrival, ranges and associated uncertainties are combined based on the relative orientations to determine the locations of the radio beacons 14, the uncertainties associated with the relative orientations have a significant impact on the accuracy of the determined radio beacon locations.

In an example, angles of arrival and ranges determined based on radio signals received at an electronic hub device 12 having a high relative orientation uncertainty are relied upon less when combined to determine radio beacon locations than angles of arrival and ranges determined based on radio signals received at an electronic hub device 12 having a low relative orientation uncertainty. By relying less upon electronic hub devices 12 having uncertain relative orientations, accuracy of the determined radio beacon locations may be improved. In order to combine the angles of arrival, ranges and associated uncertainties determined with respect to electronic hub devices 12 based on relative orientation uncertainty, weights may be assigned to the electronic hub devices 12. Electronic hub devices 12 with high relative orientation uncertainty are assigned smaller weights and electronic hub devices 12 with low relative orientation uncertainty are assigned larger weights. In an example, the angles of arrival, the ranges and the associated uncertainties are combined based on the weights to determine the locations of the radio beacons of the subset of radio beacons.

Figure 19:
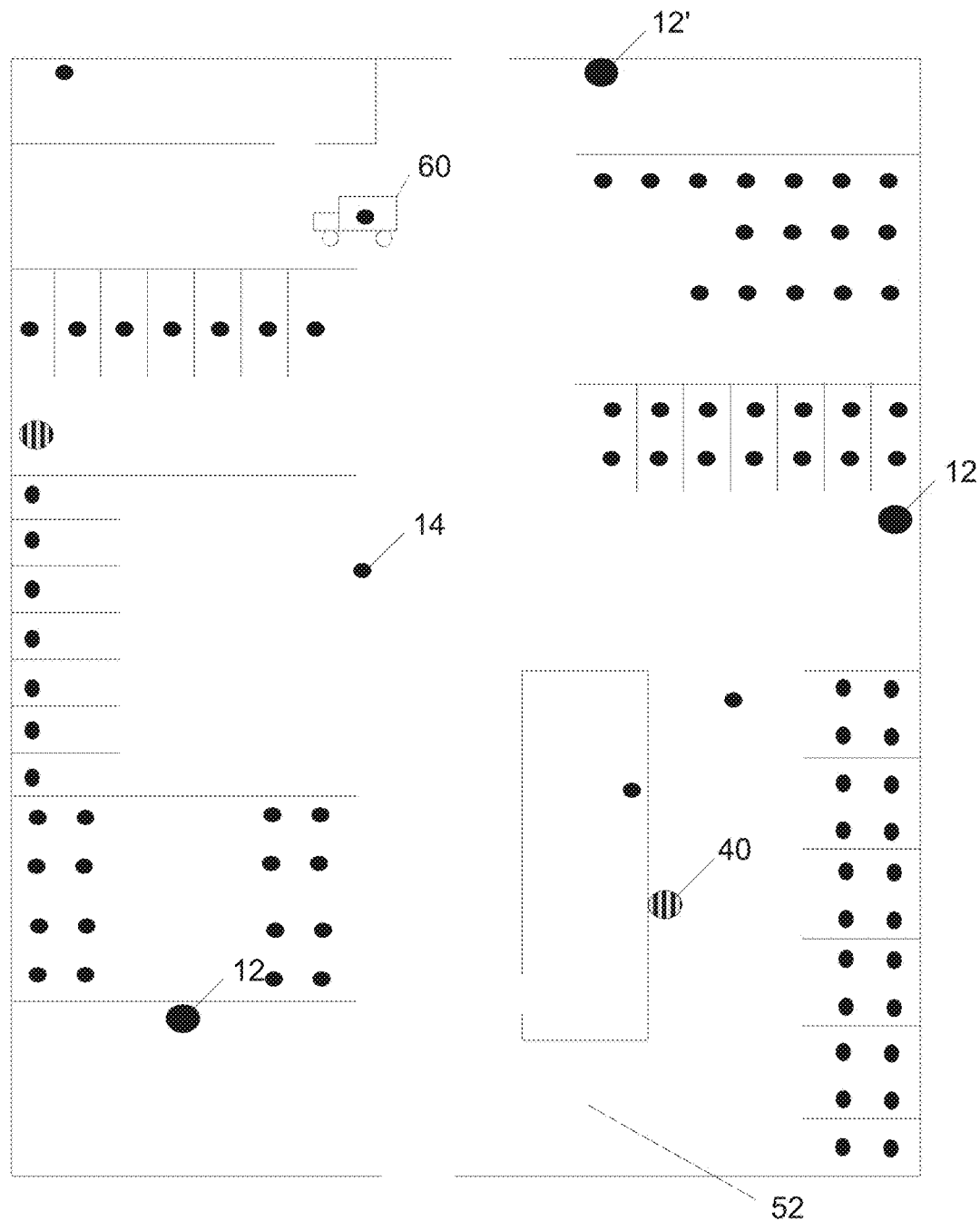
FIG. 19 is a plan view of an example deployment environment in which the radio beacon location system is deployed.

Referring to FIG. 19, an example deployment environment for the radio beacon location system 10 is shown. In this example, the deployment environment is a warehouse. Multiple radio beacons 14 are coupled to pallets, electronic equipment and moving equipment in order to track inventory and equipment.

Operation of the method of determining locations of radio beacons 14 of a beacon location system 10 in the warehouse of FIG. 19 will now be described with reference to FIG. 7. The electronic hub devices 12, nodes 40 and radio beacons 14 are first deployed at locations in the deployment environment. The locations of the electronic hub devices 12 and nodes 40 are selected so that the radio signals of at least three radio beacons 14 are received by more than one electronic hub device 12 or node 40. The locations are further selected so the electronic hub devices 12 receive radio signals from at least one other electronic hub device 12. Following deployment of the electronic hub devices 12, nodes 40 and radio beacons 14, one of the electronic hub devices 12 is assigned as master hub device 12', at 102. In this example, the master hub device 12' includes a wired internet connection so that electronic communication with the server 38 is fast. Locations of the electronic hub devices 12, 12' of the beacon location system 10 are then determined, at 104, and stored in memories 20 of the electronic hub devices 12, 12'. At 106, orientations of others of the electronic hub devices 12 are determined relative to the master hub device 12' and stored in the memory 20 of the master hub device 12'. At 112, radio beacon signals from the radio beacons 14 are received at antennas 30 of the electronic hub devices 12, 12' and nodes 40, at multiple orientations relative to the electronic hub devices 12, 12' and nodes 40. Radio sub-systems 26 of the electronic hub devices 12, 12' in communication with the antennas generate digitized data representing received signal strengths of received radio beacon signals at the multiple orientations for the electronic hub devices 12, 12' and nodes 40. The radio beacon signals from a subset of the radio beacons 14 are received by more than one electronic hub device 12, 12' or node 40. The estimated received signal strength is then determined, at 114. When estimated received signal strength has been determined for all antennas 30 of all electronic hub devices 12, 12' and nodes 40, at 116, the method continues and, at 118, beacon observations, which include angle of arrival of beacon signals and range of radio beacons 14 and associated uncertainties are determined. The angle of arrival is determined, at main processor systems 16 in communication with the radio sub-systems 26 of the electronic hub devices 12. 12', by identifying orientations of the antennas 30 of the electronic hub devices 12, 12' corresponding to strongest ones of the received radio beacon signals, the subset of the radio beacons being associated with angles of arrival at different electronic hub devices 12, 12'. The ranges between the electronic hub devices 12, 12' and the radio beacons 14 are determined, at the main processor systems 16, by calculating refined received signal strengths based on gain patterns of the antennas 30 of the electronic hub devices 12, 12' and nodes 40 and applying a propagation loss model associated with the antenna orientation to the refined received signal strengths, the subset of the radio beacons 14 being associated with ranges from the different electronic hub devices 12, 12'. At 120, it is determined if the electronic hub device 12, 12' at which the beacon observations are generated is the master hub device 12'. If the electronic hub device 12, 12' at which the beacon observations are generated is not the master hub device 12', the beacon observations are sent to the master hub device 12', at 122. If the electronic hub device 12, 12' at which the beacon observations are generated is the master hub device 12', the angles of arrival and the ranges determined at others of the electronic hub devices are received at the master hub device 12', at 124, and combined, at 126, in an estimator with the angles of arrival and the ranges determined at the master hub device 12' to determine locations of the radio beacons 14 in the deployment environment. When an acceptable level of accuracy is achieved, at 128, the beacon location system 10 waits for an alert, at 130. According to the method, others of the electronic hub devices 12 and the nodes 40 also function as radio beacons.

For the example of FIG. 19, no venue map is available so that predicted obstacles are generated in the method of determining refined location estimates of radio beacons 14 of FIG. 9 and compensated for in the method of refining a propagation loss model of FIG. 12. The method of determining locations of radio beacons 14 of a beacon location system 10 in a deployment environment is repeated until beacon locations converge by consistently falling within a determined acceptable uncertainty of one another. The method may then be repeated at regular intervals to check for any movement of the radio beacons 14. For radio beacons 14 that are coupled to moving objects, such as truck 60, the regular interval may be short so that movement of the object may be tracked more closely.

The example of FIG. 19 is an automated method in which accurate and reliable locations of the radio beacons 14 may be achieved. Other than deploying the electronic hub device 12, 12', node 40 and radio beacon 14 hardware in the deployment environment, the operator does not interact with the system 10.

Figure 20:
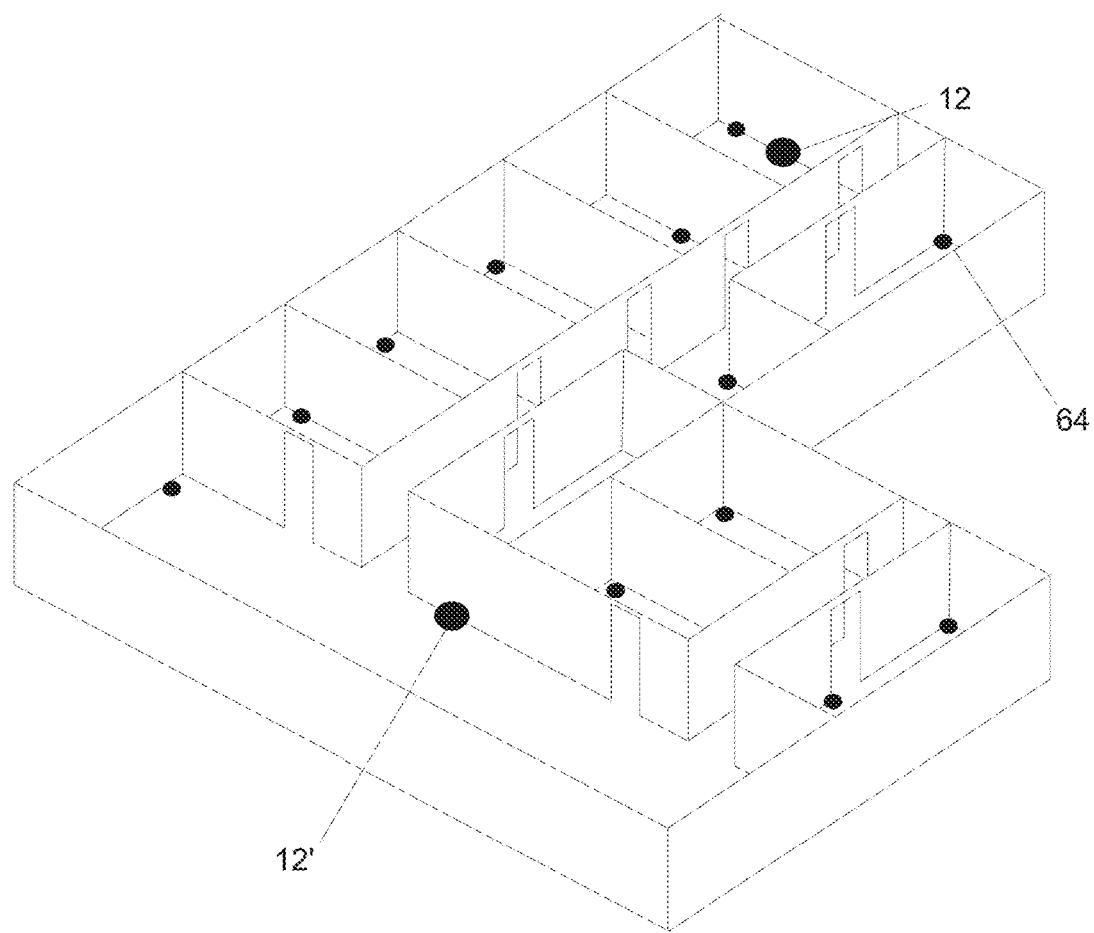
FIG. 20 is a schematic diagram showing the radio beacon location system of the present description deployed in an office building, according to an example.
Figure 21:
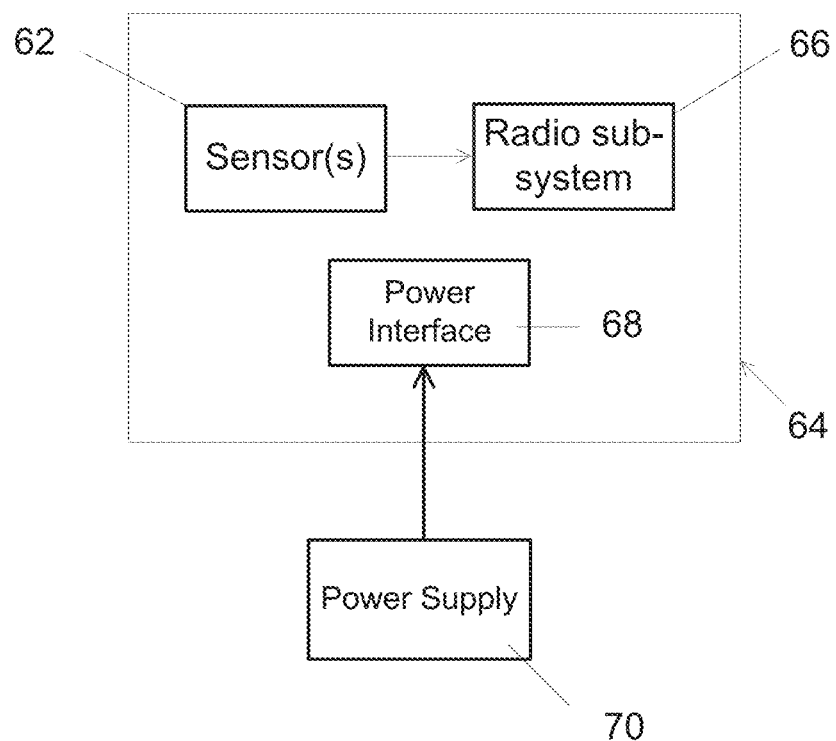
FIG. 21 is a schematic diagram of a radio beacon according to an example.

Referring to FIG. 20, another example of a deployment environment for the radio beacon location system 10 is shown. In this example, the deployment environment is a floor of an office building including multiple offices. A single floor of the office building is shown by way of example, it will be appreciated that the radio beacon location system 10 may be deployed over multiple floors. Radio beacons 64 are deployed according to this example and include one or more sensors 62, as shown in FIG. 21. The sensors 1015 communicate with a radio sub-system 66 of the radio beacon 64 to send sensor data to electronic hub devices 12, 12'. The radio beacon 64 also includes a power interface 68 and a power supply 70, such as one or more batteries, for example. The sensors 62 may be environmental sensors or other types of sensors. Sensor types of sensors 62 include temperature sensors, pressure sensors, humidity sensors, contact switches, gas sensors, light sensors, motion sensors, speed sensors, accelerometers, for example. In the example of FIG. 20, the radio beacons 64 include environmental sensors deployed for the purpose of monitoring the office so that a comfortable environment may be provided for workers in the office. In addition to radio beacons 64, other radio beacons 14 may be coupled to office equipment in order to track office inventory, such as computers, printers and chairs, for example.

Following deployment of radio beacons 64 in the office, the locations of the radio beacons 64 are determined using the method of determining locations of radio beacons described herein. In this example, the radio beacons 64 transmit sensor information within the radio signals. The sensor information is received by electronic hub devices 12, 12' and associated with the locations of the radio beacons 64 when the locations have been determined. A venue map including individual offices is available to produce the antenna-based propagation loss model in FIG. 12. Because the beacon location system 10 accurately and automatically locates the radio beacons 64 within the office, location specific sensor information may be relied upon to adjust indoor conditions in the office, for example.

Referring back to FIG. 7, other methods may be performed to generate beacon observations. According to an example, the beacon observations generated at 118 of FIG. 7 are range and associated antenna orientation for all of the antenna orientations of the electronic hub device 12 at which radio beacon signals are received. In this example, rather than using the angle of arrival to determine a single beacon observation per electronic hub device 12, multiple beacon observations may be generated. The number of beacon observations generated depends on the number of antenna directions of the electronic hub device 12 at which radio beacon signals are received and the number of beacon observations per antenna. Range is determined in the manner described with respect to FIG. 11. Antenna direction is known based on the method of orienting electronic hub devices 12 of FIG. 17 or another orientation method.

Figure 22:
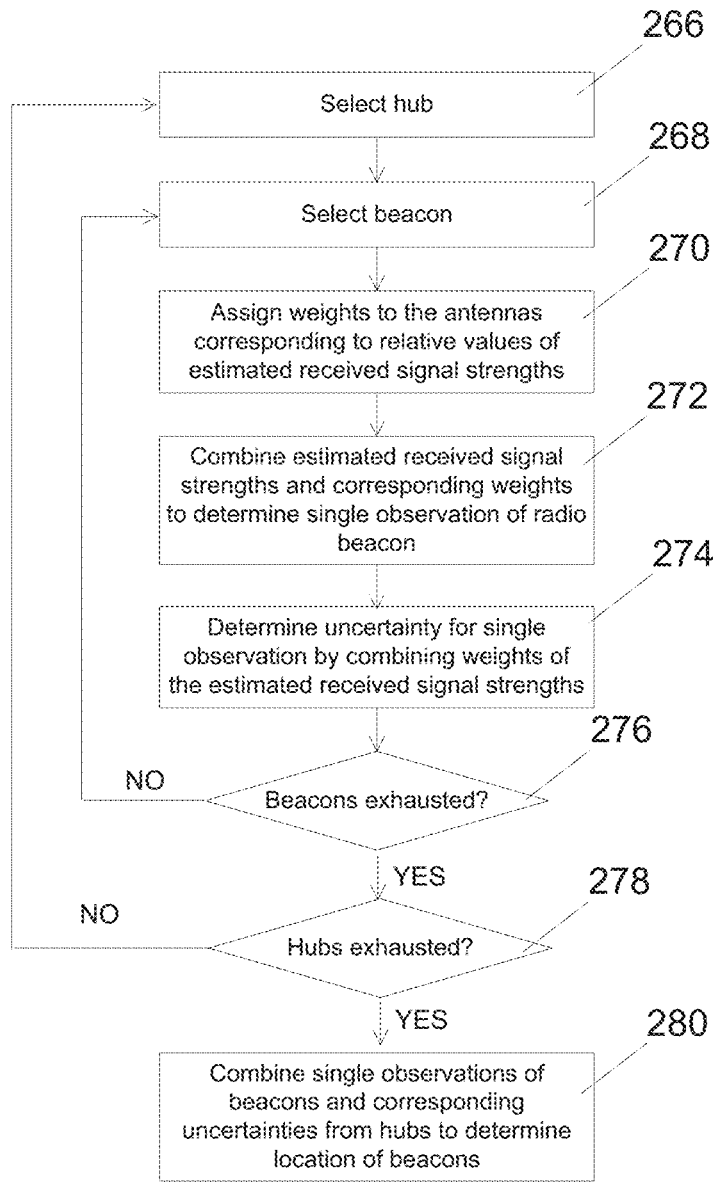
FIG. 22 is a flowchart depicting an estimation method to determine refined location estimates.

Following determination of the beacon observations, the beacon observations are input into the estimation method, at 264, of the method of determining refined location estimates of radio beacons of FIG. 9. According to the example, rather than performing 150 and 152, the estimation method of FIG. 22 is performed. Referring to FIG. 22, at 266 and 268, an electronic hub device 12 and a radio beacon 14 are selected. Then, at 270, weights are assigned to the multiple antenna orientations of the electronic hub device 14 corresponding to relative values of estimated signal strength. Estimated received signal strengths and corresponding weights are combined, at 272, to determine single observations of the radio beacons 14 at the electronic hub devices 12 at which radio beacon signals for those radio beacons 14 are received. The single observations include range and direction estimations. Uncertainties for the single observations are determined, at 274, by combining weights of the estimated received signal strengths. When the radio beacons 14 are exhausted, at 276, and the electronic hub devices 12 are exhausted, at 278, the single observations and the corresponding uncertainties are combined, at 280, to determine locations of the radio beacons 14 and uncertainties thereof.

The relative values of estimated signal strength are determined on an electronic hub device by electronic hub device basis by dividing the estimated received signal strength for respective antenna orientations by a largest one of the estimated received signal strengths of all antenna orientations of the electronic hub device 12. The weights may be equal to the relative values or may be adjusted to account for other factors that may affect the estimated received signal strength. Other factors include: reliability associated with the respective antenna directions and presence of obstacles in front of the respective antenna directions, for example.

The uncertainty of the single observations may be determined by summing the weights of the estimated received signal strengths. Alternatively, the uncertainty may be equal to a single one of the weights of the estimated received signal strengths, such as a largest one of the weights, for example. The uncertainty of the single observation may be adjusted based on other factors including: an overall received signal strength pattern at the electronic hub device 12 and a magnitude of the largest received signal strength at the electronic hub device 12, for example. An overall received signal strength pattern that includes more than a single peak, is indicative of a single observation that is less reliable and therefore, an uncertainty associated therewith has a higher uncertainty. A relatively low RSSI value is indicative of a radio beacon 14 that is relatively far from the electronic hub device 12 and a relatively high RSSI value is indicative of a radio beacon 14 that is relatively close to the electronic hub device 12. Thus, greater uncertainty is associated with the relatively low RSSI value than the relatively high RSSI value.

Similarly, the uncertainty of the location may be determined by summing the weights of the estimated received signal strengths. Alternatively, the uncertainty may be equal to one of the weights of the single observations, such as a largest one of the weights, for example. Other factors, such as those listed above, may also or alternatively contribute to the uncertainty of the location.

The method of FIG. 22 is performed for radio beacons 14 belonging to a group of radio beacons 14 that meet one or more thresholds. In an example, the thresholds are: 1) radio beacon signals from the radio beacon 14 are received at more than one antenna orientation; and 2) radio beacon signals from the radio beacon 14 are received at more than one electronic hub devices 12. Radio beacons 14 that generate radio beacon signals that are received at only one of the multiple antenna orientations of one or more than one electronic hub device 12 are not considered in the example described herein because observations associated with such radio beacons 14 are determined to be unreliable. For radio beacons 14 that generate radio beacon signals received at more than one of the multiple orientations of only one electronic hub device, the single observation is the determined radio beacon location.

Figure 23:
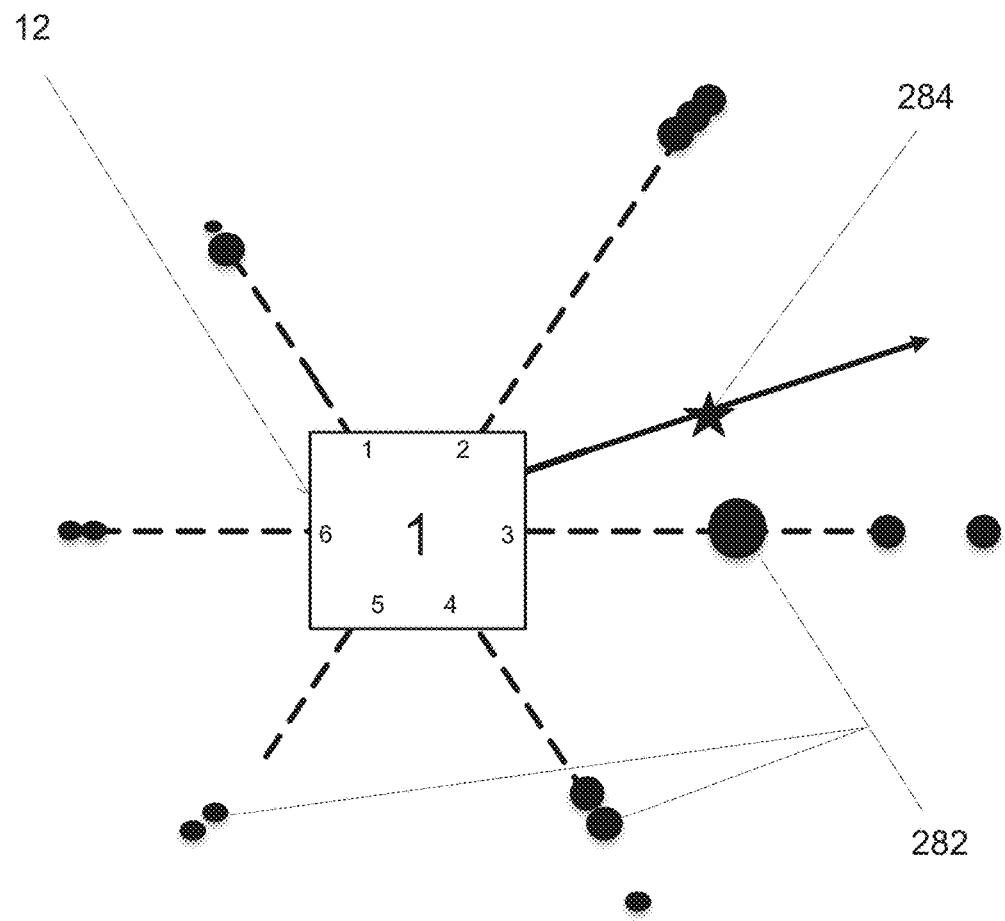
FIG. 23 is a schematic diagram showing a single observation determined based on beacon observations by an electronic hub device.
Figure 24:
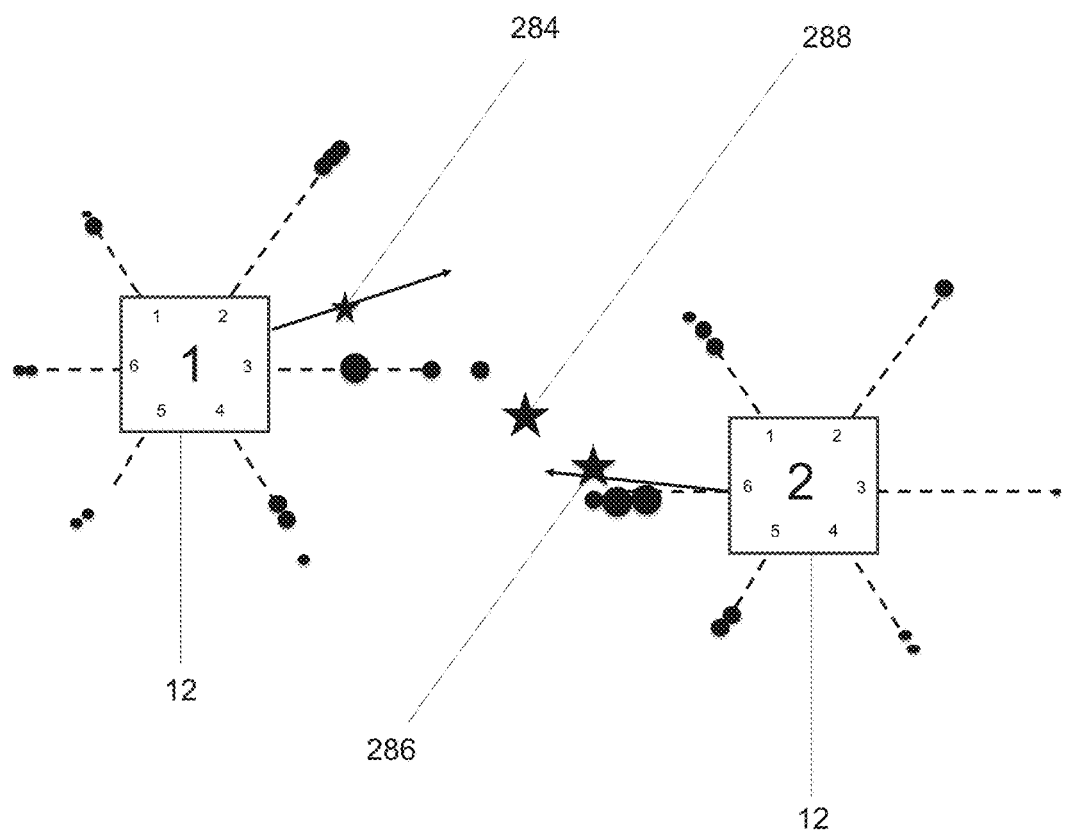
FIG. 24 is a schematic diagram showing a location determined based on single observations by two electronic hub devices.

Operation of the method of FIG. 22 will now be described with reference to FIGS. 23 and 24. As shown a first electronic hub device 12 includes six antenna orientations. In this example, signals from a radio beacon (not shown) are received at all six antenna orientations of the first electronic hub device 12, as indicated by observations 282 of the radio beacon, which are represented by dots, as shown. At 270, weights are assigned to the different antenna orientations based on the relative values of estimated signal strength. The relative sizes of the dots indicate the relative sizes of the estimated received signal strengths at the different antenna orientations. Because the observation 282 at antenna number 3 has the largest estimated received signal strength of all of the observations, the weight assigned thereto is equal to one. It follows that all other weights assigned are less than one. At 272 and 274, the estimated received signal strengths and corresponding weights are combined to determine the single observation 284, which includes a range and direction estimation and is represented by a star, as shown. Referring also to FIGS. 24, 270 and 272 are performed for the second electronic hub device 12 to determine a single observation 286 therefor. Uncertainties for the single observations 284, 286 are determined, at 274, by combining the weights of the estimated received signal strengths for the first electronic hub device 12 and the second electronic hub device 12, respectively. Relative uncertainties of the single observations 284, 286 are indicated by the size of the stars in FIG. 24. As indicated, there is a greater uncertainty associated with the single observation of the first electronic hub device 12. The single observations 284, 286 and the corresponding uncertainties are then combined, at 280, to determine a location 288 and uncertainty of the radio beacon 14.

By performing the method of FIG. 22, all estimated received signal strengths for radio beacons 14 belonging to the group are considered when determining the location of a radio beacon 14. Advantageously, the contribution from the electronic hub devices 12 to the determined radio beacon locations is based on the overall signal level received at the electronic hub devices 12. By determining the location without discarding any of the estimated received signal strengths, the determined location is more likely to be accurate. Further, errors attributable to characteristics of the deployment environment, for example, are more likely to be detected.

According to an example, angles of arrival may be determined from the radio beacon locations 288 to the electronic hub devices 12 and compared to angle of arrival determinations from the method of FIG. 10. Such a comparison may be included as part of the validity check described with respect to FIG. 7 to detect obvious errors.

According to another example, range is determined based on estimated received signal strength rather than refined received signal strength and the radio beacon locations are determined without a separate angle of arrival estimation. Thus, there is no reliance on estimated angle of arrival to determine the radio beacon location. An advantage of this implementation is that radio beacon locations are not affected by errors associated with angle of arrival calculations.

The beacon location system 10 is useful for radio beacons 14 that the electronic hub devices 12, 12' control and for third party beacons, such as smart phones and tablets, for example. The beacon location system 10 may determine locations of third party radio beacons 14 within a coverage area of the beacon location system 10 and may track movement of third party devices that are passing through the coverage area.

When the radio beacons 14 are controllable by the electronic hub devices 12, 12', the radio beacons 14 may be configured by the electronic hub devices 12, 12'. For example, a signal transmission power of respective radio beacons 14 may be adjusted by the electronic hub devices 12, 12' and battery level information of the radio beacons 14 may be received, for example. Also, because the type of antenna of the electronic hub devices 12, 12' receiving radio beacon signals from the radio beacon 14 is known, the antenna gain is used to refine the received signal strength, as has been described, and improve the overall accuracy of the location estimates.

The electronic hub devices 12, 12' function as multi-purpose network infrastructure because the electronic hub devices 12, 12' may be used as WiFi hubs within the deployment environment. In an example, data source information about the electronic hub devices 12, 12' is gathered, such as memory usage, CPU usage and available network usage bandwidth.

In general, the apparatus, method and system disclosed herein facilitates accurate determination of locations of multiple radio beacons 14 deployed in indoor environments or other environments in which GNSS signal reception is limited. In an example, location within 2 to 3 meters of an actual location may be achieved. Although particularly useful in environments in which GNSS signal reception is limited, the apparatus, method and system disclosed herein is not limited to use in such environments.

The method of determining locations of radio beacons described herein orients the electronic hub devices relative to one another based on received signal strength without any user input. This method is reliable in any type of deployment environment and is significantly less time consuming than manual orientation, which includes physically aligning the electronic hub devices 12, 12' relative to one another. In addition to being time consuming, manual orientation may introduce significant errors when not performed correctly.

The method of determining locations of radio beacons compensates for obstacles in the deployment environment when a venue map is available and when a venue map is not available, thus improving the accuracy and reliability of location estimation. According to the method, a subset of radio beacons is within coverage areas of more than one electronic hub device 12, 12'. Thus, observations of those radio beacons 14 relative to more than one electronic hub device 12, 12' are generated, which also improves the accuracy and reliability of location estimation.

Because the electronic hub devices 12 are self-locating, the beacon location system 10 does not rely on user input thus avoiding errors that may be introduced when incorrect information is provided by the user or when electronic hub devices 12, 12' are moved.

Specific examples have been shown and described herein. However, modifications and variations may occur to those skilled in the art. All such modifications and variations are believed to be within the scope and sphere of the present disclosure.

The invention claimed is:

1. A method of determining locations of radio beacons of a location system, comprising:
   determining locations of electronic hub devices of the location system, storing the locations in memories of the electronic hub devices;
   determining relative orientations of antennas of the electronic hub devices, storing the relative orientations in memories of the electronic hub devices;
   receiving, at the antennas of the electronic hub devices, radio beacon signals from the radio beacons, the antennas configured to receive the radio beacon signals at multiple orientations relative to the electronic hub devices, radio sub-systems of the electronic hub devices in communication with the antennas generating digitized data representing received signal strengths of received radio beacon signals at the multiple orientations for the electronic hub devices, the radio beacon signals from a subset of the radio beacons received by more than one electronic hub device;

determining, at main processor systems in communication with the radio sub-systems of the electronic hub devices, estimated received signal strengths for the multiple orientations of the electronic hub devices based on the received signal strengths of the received radio beacon signals over a period of time;

determining, at the main processor systems, angles of arrival of the received radio beacon signals by identifying orientations of the antennas of the electronic hub devices corresponding to strongest ones of the received radio beacon signals, the strongest ones determined by comparing the estimated received signals strengths of the multiple orientations, the subset of the radio beacons being associated with angles of arrival at the more than one electronic hub device;

determining, at the main processor systems, ranges between the electronic hub devices and the radio beacons by calculating refined received signal strengths of the radio beacons based on the estimated received signal strengths and gain patterns of the antennas of the electronic hub devices and applying propagation loss models associated with the antenna orientations to the refined received signal strengths, the subset of the radio beacons being associated with ranges from the more than one electronic hub device; and combining the angles of arrival, the ranges and associated uncertainties in an estimator based on the relative orientations to determine the locations of the radio beacons of the subset of radio beacons in a deployment environment.

2. The method of claim 1, wherein weights are assigned to the electronic hub devices based on uncertainties associated with the relative orientations, the angles of arrival, the ranges and the associated uncertainties combined based on the weights to determine the locations of the radio beacons of the subset of radio beacons.

3. The method of claim 1, comprising assigning one of the electronic hub devices as a master hub device, the relative orientations of others of the electronic hub devices determined with respect the master hub device, the relative orientations stored in memory of the master hub device.

4. The method of claim 3, comprising receiving, at the master hub device, the angles of arrival and the ranges determined at the others of the electronic hub devices and combining the angles of arrival and the ranges and associated uncertainties of the others of the electronic hub devices with the angles of arrival and the ranges and uncertainties determined at the master hub device in the estimator.

5. The method of claim 1, wherein the angles of arrival and the ranges are determined at the electronic hub devices and the locations are determined at one or more servers in communication with the electronic hub devices.

6. The method of claim 1, wherein the digitized data representing received signal strengths of received radio beacon signals is sent to one or more servers in communication with the electronic hub devices and the locations are determined at the one or more servers.

7. The method of claim 1, wherein one or more of the radio beacons are moving.

8. The method of claim 1, wherein the radio beacons are configurable by the electronic hub devices.

9. The method of claim 1, wherein the estimated received signal strength is determined by identifying a frequency with least traffic and selecting a received signal strength associated with that frequency, the received signal strength being weighted based on a volume of traffic.

10. The method of claim 1, wherein the electronic hub devices comprise GNSS receivers and the locations of the electronic hub devices are determined based on self-location by the electronic hub devices.

11. The method of claim 9, wherein the radio beacon signals are BLE signals and the frequency is one of three frequencies, the three frequencies corresponding to three transmission channels.

12. The method of claim 1, wherein the antennas comprise one of: multiple directional antennas and mechanically steered directional antennas to receive the radio beacon signals at multiple orientations relative to the electronic hub devices.

13. The method of claim 1, wherein when obstacles are present in the deployment environment in front of one or more of the antennas, ones of the propagation loss models associated with the one or more of the antennas compensate for the obstacles in the deployment environment.

14. The method of claim 4, wherein the angles of arrival and the ranges determined at others of the electronic hub devices are sent from second radio sub-systems of the others of the electronic hub devices.

15. The method of claim 1, wherein the second radio sub-systems communicate using WiFi radio signals.

16. An electronic hub device for determining locations of radio beacons, comprising:
    a GNSS antenna;
    a GNSS sub-system;
    an antenna comprising six directional antennas to receive radio beacon signals at six orientations;
    a radio sub-system in communication with the antenna to generate digitized data representing received signal strengths of received radio beacon signals at the six orientations;
    a main processor system in communication with the radio sub-system to: determine estimated received signal strengths for the six orientations of the electronic hub devices based on the received signal strengths of the received radio beacon signals over a period of time, determine angles of arrival of the received radio beacon signals by identifying orientations of the antenna corresponding to strongest ones of the received radio beacon signals, the strongest ones determined by comparing the estimated received signals strengths, determine ranges by calculating refined received signal strengths based on the estimated received signal strengths and gain patterns of the antenna and applying propagation loss models associated with the antenna orientations to the refined received signal strengths and map the angles of arrival and ranges to locations based on a known location of the electronic hub device.

* * * * *